`US005513041A`

United States Patent [19]
Togino

[11] Patent Number: 5,513,041
[45] Date of Patent: Apr. 30, 1996

[54] VISUAL DISPLAY APPARATUS COMPRISING A DECENTERED CORRECTING OPTICAL SYSTEM

[75] Inventor: Takayoshi Togino, Koganei, Japan

[73] Assignee: Olympus Optical Co., Ltd., Tokyo, Japan

[21] Appl. No.: 193,858

[22] Filed: Feb. 9, 1994

[30] Foreign Application Priority Data

Feb. 9, 1993 [JP] Japan .................................. 5-021208
Oct. 28, 1993 [JP] Japan .................................. 5-270768

[51] Int. Cl.$^6$ .................................. G02B 27/14; G02B 17/00
[52] U.S. Cl. ........................... 359/631; 359/630; 359/434; 359/728
[58] Field of Search ............................... 359/630, 631, 359/634, 727, 434, 435, 433, 728

[56] References Cited

U.S. PATENT DOCUMENTS

| | | | |
|---|---|---|---|
| 3,940,204 | 2/1976 | Withrington | 359/630 |
| 4,218,111 | 8/1980 | Withrington | 359/630 |
| 4,447,128 | 5/1984 | Ferrer | 359/40 |
| 4,669,810 | 6/1987 | Wood | 359/631 |
| 4,763,990 | 8/1988 | Wood | 359/634 |
| 4,826,287 | 5/1989 | Cook | 347/7 |
| 5,073,016 | 12/1991 | Burke | 359/727 |
| 5,287,218 | 2/1994 | Chen | 359/365 |
| 5,299,063 | 3/1994 | Fritz | 359/631 |
| 5,303,085 | 4/1994 | Rallison | 359/631 |
| 5,357,372 | 10/1994 | Chen | 359/630 |
| 5,384,654 | 1/1995 | Iba | 359/630 |

*Primary Examiner*—Georgia Y. Epps
*Assistant Examiner*—Ricky Mack
*Attorney, Agent, or Firm*—Cushman, Darby & Cushman

[57] ABSTRACT

A visual display apparatus which enables observation of an image that is flat and clear as far as the edges of visual field at a view angle of 40° or more and which ensures a large exit pupil diameter. The visual display apparatus has a two-dimensional image display device (14) for displaying an image for observation, a relay optical system (15) for projecting in the air a real image of the image display device (14), and an ocular concave reflecting optical system (3) for projecting the real image as an enlarged image in the air and for reflectively bending the optical axis. A decentered correcting optical system (8) which has surfaces decentered with respect to each other is disposed between the relay optical system (15) and the ocular concave reflecting optical system (3). The angle of reflective bending by the ocular concave reflecting optical system (3) is preferably 60° or more.

14 Claims, 22 Drawing Sheets

FIG. 3
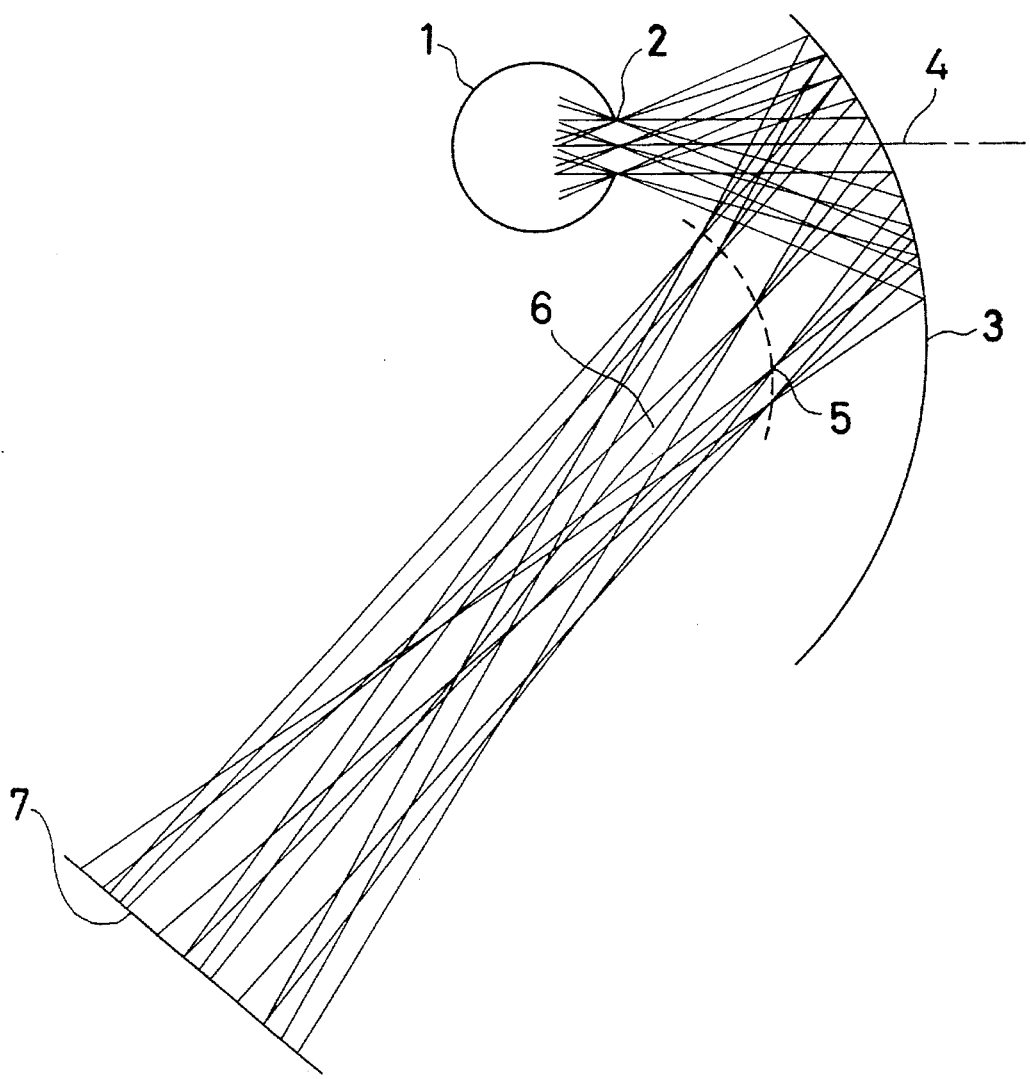
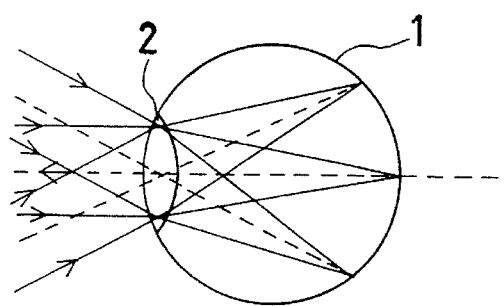
FIG. 4(a)
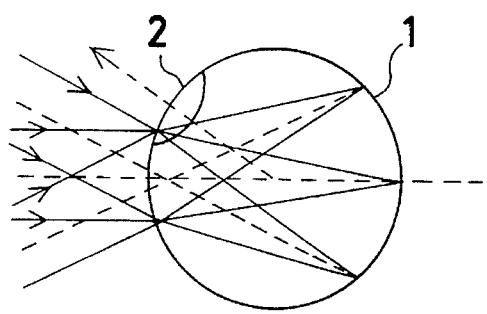
FIG. 4(b)

VISUAL DISPLAY APPARATUS COMPRISING A DECENTERED CORRECTING OPTICAL SYSTEM

BACKGROUND OF THE INVENTION

The present invention relates to a portable visual display apparatus and, more particularly, to a head- or face-mounted visual display apparatus that can be retained on the observer's head or face.

A head-mounted visual display apparatus such as that shown in the plan view of FIG. 22 has heretofore been known (see U.S. Pat. No. 4,026,641). In the conventional head-mounted visual display apparatus, an image of an image display device 46, e.g., a CRT, is transferred to an object surface 12 by an image transfer device 25, and the image transferred to the object surface 12 is projected in the air by a toric reflector 10.

As another related art, a head-mounted visual display apparatus that uses a decentered concave ocular optical system and a decentered relay optical system is disclosed in Japanese Patent Application No. 03-295874 (1991) by the present applicant. FIG. 23 is a sectional view of one embodiment of the prior head-mounted visual display apparatus. In the figure, reference symbols denote elements or portions as follows: P is the axis of rolling of an observer's eyeball 13; C is the observer's visual axis lying when he or she sees forward; $Q_1$ is the position of the observer's pupil; $S_8$ is a spheroid having T as an axis of revolution; 16 is a reflecting surface of the spheroid; 17 is an optical axis of a relay optical system; $Q_2$ is the focal point of the spheroid; 15 is the relay optical system; and 14 is a two-dimensional image display device.

For a head-mounted visual display apparatus, it is important to minimize the overall size and weight thereof in order to make the observer feel comfortable when wearing it. An essential factor in determining the overall size of the apparatus is the layout of the optical system.

In the case of a direct-vision layout in which an enlarged image of a two-dimensional image display device is observed directly through a convex lens, the amount to which the apparatus projects from the observer's face is unfavorably large. Further, it is necessary in order to provide a wide angle of view to use a large positive lens system and a large two-dimensional image display device. Accordingly, the apparatus inevitably becomes large in size and heavy in weight.

To enable the observer to use the apparatus for a long time without fatigue and to attach and detach the apparatus with ease, it is preferable to adopt an arrangement in which an ocular optical system including a reflecting surface is disposed immediately in front of the observer's eyeball. With this arrangement, a two-dimensional image display device, an illuminating optical system, etc. can be disposed in a compact form around the observer's head. Thus, it is possible to reduce the amount of projection of the apparatus and also the weight thereof.

Next, it is necessary to ensure a wide angle of view in order to enhance the feeling of being at the actual spot which is given to the observer when viewing the displayed image. In particular, the stereoscopic effect of the image presented is determined by the angle at which the image is presented (see The Journal of the Institute of Television Engineers of Japan Vol. 45, No. 12, pp. 1589–1596 (1991)).

The next matter of great concern is how to realize an optical system which provides a wide angle of view and high resolution.

It is known that it is necessary in order to present a stereoscopic and powerful image to the observer to ensure a view angle of 40° (±20°) or more in the horizontal direction, and that the stereoscopic and other effects are saturated in the vicinity of 120° (±60°). In other words, it is preferable to select an angle of view which is not smaller than 40° and which is as close to 120° as possible. However, in a case where the above-described ocular optical system is a plane reflecting mirror, it is necessary to use an extraordinarily large two-dimensional image display device in order to make light rays incident on the observer's eyeball at a view angle of 40° or more. After all, the apparatus increases in both the overall size and weight.

Further, since a concave mirror produces strong curvature of field along the surface of the concave mirror because of its nature, if a planar two-dimensional image display device is disposed at the focal point of a concave mirror, the resulting observation image surface is curved, so that it is impossible to obtain an image for observation which is clear as far as the edges of visual field. There is a method wherein the display surface of a two-dimensional image display device is curvedly disposed, as in the case of the prior art shown in FIG. 22. However, even when a two-dimensional image display device is disposed at the front focal point of a concave mirror so that an image of the two-dimensional image display device is projected in the air as an enlarged image by only a concave mirror, as in the arrangement shown in FIG. 22, it is difficult to obtain high resolution because of the aberration of the concave mirror when a view angle of 40° or more is provided.

When a decentered correcting optical system is used as in the arrangement shown in FIG. 23, since the decentered correcting optical system lies in the vicinity of the observer's face, the user cannot observe the displayed image with his/her spectacles or the like on. The reason for this will be clear from FIG. 23. That is, a frame portion of the spectacles interferes with the decentered correcting optical system, and light rays from the relay optical system, which forms an image for observation, strike a spectacle lens from the rear side thereof. Therefore, it is impossible to observe a normal observation image.

In view of the above-described problems of the background art, it is an object of the present invention to provide a visual display apparatus which provides a wide angle of view, and yet which is small in size and light in weight and has high resolution and a large exit pupil diameter, and also provide a visual display apparatus which has the above-described advantageous features, and yet which enables the user to observe a displayed image with his/her spectacles on.

The purpose of providing a large exit pupil diameter in the present invention will be explained below. If the exit pupil diameter of the optical system is not sufficiently large, the visual field is eclipsed by the rolling movement of the eye when the user tries to observe a peripheral region of the visual field. The way in which eclipse occurs is shown in FIGS. 4(a) and 4(b). In FIG. 4(a) a state wherein the position of the pupil 2 of the observer's eye 1 when observing the center of the visual field is coincident with the position of the exit pupil of the optical system is depicted. On the other hand, FIG. 4(b) shows a state wherein, to observe a peripheral region of the visual field, the observer rolls his/her eye 1 toward it. In this case, since the observer's pupil 2 and the rolling axis of the eye 1 are displaced from each other, it seems as if the pupil 2 were transversely offset. For this reason, when the observer turns his/her eye 1 leftward to observe the left, for example, the right-hand side visual field is eclipsed and becomes invisible.

Further, the positional relationship between the observer's pupil and the exit pupil of the apparatus may change according to the condition in which the apparatus is attached to the observer's head or face. Unless the apparatus has an exit pupil diameter which is larger than the observer's pupil diameter to a certain extent, it is impossible to absorb a displacement between the observer's pupil position and the exit pupil position of the apparatus, which occurs according to the condition in which the apparatus is mounted or the difference in physical size and shape among individuals. Consequently, the image for observation is partly cut off by the observer's pupil, and a wide angle of view cannot be ensured.

To solve the above-described problem, it is essential to design the observation optical system so that it has a sufficiently large exit pupil diameter. It is difficult even in ordinary camera lenses to increase the pupil diameter, that is, to reduce the F-number, from the viewpoint of correcting aberrations of the lens. Therefore, it is extremely difficult to double the pupil diameter. For example, although a standard lens for camera that has an F-number of 2.8 and a focal length of 50 mm is of the triplet type, which is made of three lens elements, a standard lens for camera having an F-number of 1.4 needs a Gauss type lens system, which includes six lens elements. Thus, to double the pupil diameter (that is, to halve the F-number), the arrangement of the optical system must be changed to a considerable extent, which invites an increase in size of the lens arrangement.

Incidentally, about half of the general people suffer from visual disorders such as myopia, astigmatism, etc. The proportion of contact lens users to the total number of people using glasses has been increasing in recent years. However, the use of contact lenses is still limited to some people because of the troublesomeness in handling the lenses or conservatism, and most people suffering from visual disorders still use spectacles in view of price, handling and so forth.

To enable a person who uses glasses to view a clear image for observation without glasses by using a visual display apparatus such as that shown in FIG. 22 or 23, for example, some diopter correcting device must be provided on the visual display apparatus side.

However, when a device for correcting diopter, including astigmatism, is provided on a visual display apparatus such as that of the present invention, which aims at reducing the overall size and weight of the apparatus, various problems arise. That is, the size and weight of the apparatus are increased, and it is extremely difficult to enable the amount of correction of diopter, which is made on the apparatus side, to be appropriately adjusted so that the corrected diopter matches the observer's eyes. When a user who has normal eyesight observes for a long time with a wrong diopter, the observer's diopter adjusts to the wrong diopter on the apparatus side, which involves the danger of the observer's eyesight becoming poor.

Further, to perform "superimpose" observation in which an aerial image of a two-dimensional image display device and an observation image in the outside, real world are viewed superimposed on one another, a diopter correcting mechanisms must be added for both the outside world image and the aerial image, which is projected in the air by the visual display apparatus, resulting in a further increase in size of the apparatus.

SUMMARY OF THE INVENTION

The present invention has been made to solve the above-described problems of the background art, and it is a first object of the present invention to provide a visual display apparatus which enables observation of an image that is flat and clear as far as the edges of visual field at a view angle of 40° (±20°) or more and which ensures a large exit pupil diameter.

It is a second object of the present invention to provide a visual display apparatus which enables the user to observe clearly an aerial image projected in space at a wide angle of view with his/her spectacles on.

To attain the above-described objects, the present invention provides a visual display apparatus having an image display device for forming an image for observation, a relay optical system for relaying a real image of the image display device, and an ocular concave reflecting optical system for projecting the real image relayed by the relay optical system as an enlarged image and for reflectively bending a bundle of rays emitted from the image display device. The visual display apparatus includes a decentered correcting optical system disposed between the relay optical system and the ocular concave reflecting optical system and having a lens surface decentered with respect to an optical axis formed by the relay optical system.

In addition, the present invention provides a visual display apparatus having an image display device for forming an image for observation, a relay optical system for relaying a real image of the image display device, and an ocular concave reflecting optical system for projecting the real image relayed by the relay optical system as an enlarged image and for reflectively bending a bundle of rays emitted from the image display device. The visual display apparatus includes a decentered correcting optical system disposed between the relay optical system and the ocular concave reflecting optical system and having one lens which is provided so that a surface thereof which faces the relay optical system and a surface thereof which faces the ocular concave reflecting optical system are both decentered with respect to an optical axis formed by the relay optical system.

In addition, the present invention provides a visual display apparatus having an image display device for forming an image for observation, a relay optical system for relaying a real image of the image display device, and an ocular concave reflecting optical system for projecting the real image relayed by the relay optical system as an enlarged image and for reflectively bending a bundle of rays emitted from the image display device. The visual display apparatus includes a decentered correcting optical system disposed between the relay optical system and the ocular concave reflecting optical system and having one lens which is provided so that a surface thereof which faces the relay optical system and a surface thereof which faces the ocular concave reflecting optical system are both decentered with respect to an optical axis formed by the relay optical system, and that the optical axis of the surface on the relay optical system side and the optical axis of the surface on the ocular concave reflecting optical system side intersect each other.

In addition, the present invention provides a visual display apparatus having an image display device for forming an image for observation, a relay optical system for relaying a real image of the image display device, and an ocular concave reflecting optical system for projecting the real image relayed by the relay optical system as an enlarged image and for reflectively bending a bundle of rays emitted from the image display device. The visual display apparatus includes a decentered correcting optical system disposed between the relay optical system and the ocular concave reflecting optical system and having a lens which is not rotationally symmetric with respect to an optical axis formed by the relay optical system.

In these visual display apparatuses, the ocular concave reflecting optical system preferably has a configuration whereby the above-described bundle of rays is reflectively bent at 60° or more.

Further, the surface of the decentered correcting optical system that is the closest to the ocular concave reflecting optical system is preferably convex toward the ocular concave reflecting optical system.

Furthermore, the decentered correcting optical system is preferably provided at or near an image surface relayed by the relay optical system.

The decentered correcting optical system may include an anamorphic surface. In this case, the anamorphic surface is preferably formed so that refractive power in a plane containing the optical axes of the image display device, the relay optical system and the ocular concave reflecting optical system is larger than refractive power in a plane perpendicular to the above-described plane.

Further, the decentered correcting optical system may have an aspherical surface.

The relay optical system may be decentered with respect to the optical axis of the image display device.

The surface of the decentered correcting optical system that is decentered with respect to the optical axis formed by the relay optical system may also be decentered with respect to the optical axis of the image display device.

It should be noted that in a case where the ocular concave reflecting optical system has a configuration whereby the bundle of rays is reflectively bent at at least 60°, the lens of the decentered correcting optical system, which has a surface decentered with respect to the optical axis formed by the relay optical system, preferably satisfies the following condition (3):

$$R_{Y1}/R_{Y2} < 0.5 \tag{3}$$

where $R_{Y1}$ is the radius of curvature of the surface of the above-described lens that faces the ocular concave reflecting optical system, and $R_{Y2}$ is the radius of curvature of the surface of the lens that faces the relay optical system.

The reason for adopting the above-described arrangements and the functions thereof will be explained below. The following explanation will be made along an optical path of backward tracing in which light rays are traced from the observer's iris position toward the two-dimensional display device for the convenience of design.

The decentered correcting optical system, which is disposed between the ocular concave reflecting optical system and the relay optical system, is adapted to correct aberration unsymmetrical with respect to the optical axis which is produced in the ocular concave reflecting optical system, which is disposed in a decentered position.

The reason for adopting the above-described arrangement will be explained below with reference to FIG. 3 in which illustration of the relay optical system is omitted. FIG. 3 shows curvature of field produced by an ocular concave mirror of an optical system for the observer's right eye. An optical system for the observer's left eye is disposed in symmetric relation to the optical system shown in FIG. 3. In the figure, reference numeral 1 denotes the observer's eyeball, and 2 the observer's pupil position. Reference numeral 3 denotes an ocular concave mirror, and 4 the observer's visual axis. Reference numeral 5 denotes the image surface of an object at infinity formed by the ocular concave mirror 3, and 6 the optical axis bent by the ocular concave mirror 3. Reference numeral 7 denotes the position where the observer's pupil is projected by the ocular concave mirror 3.

In the figure, the pupil diameter at the observer's eyeball position 1 is 8 mm, and light rays are traced at view angles of 50° (half view angle: 25°) and 35° (half view angle: 17.5°). In an ocular concave reflecting optical system having a wide angle of view, i.e., wider than 40°, the focal surface 5 of the concave mirror is curved due to the image forming characteristics of the concave mirror, as has been described above. The visual axis 4, which lies in the center of the angle of view, is reflected by the ocular concave mirror 3 to form an optical axis 6. Since the ocular concave mirror 3 is decentered with respect to the visual axis 4, the image surface 5 and the optical axis 6 are not perpendicular to each other. Thus, the image surface 5 is formed at a tilt with respect to the optical axis 6.

In other words, since the decentered concave mirror 3 bends even the optical axis 6, it forms an image surface 5 which is curved as well as tilted with respect to the optical axis 6 lying in the center of the angle of view. The curvature of field is similarly produced regardless of whether the concave reflecting mirror 3 is formed from an aspherical surface or a toric surface.

To project the above-described image surface on the two-dimensional image display device by the relay optical system is to demand the relay optical system to project a tilted and curved object surface on the planar two-dimensional image display device. It is a generally known fact that the tilt and curvature of the image surface can be corrected by the decentration of the relay optical system and the tilt of the two-dimensional image display device without a decentered correcting optical system such as that used in the present invention. However, it is difficult to satisfy the demand for a large pupil diameter and high resolution simultaneously, and a large-scale relay optical system is needed to meet the requirements.

Accordingly, in the present invention, the decentered correcting optical system, which raises the object surface curved and tilted with respect to the optical axis to a position perpendicular to the optical axis and which also corrects the curvature of field, is disposed in the vicinity of the image surface between the ocular concave reflecting optical system and the relay optical system, thereby succeeding in simultaneously correcting the tilt of the image surface with respect to the optical axis and the curvature thereof.

It is preferable that at least one surface of the decentered correcting optical system should be tilted with respect not only to the optical axis but also to the optical axis of the relay optical system, and at the same time the two surfaces of the decentered correcting optical system should be formed of surfaces which are decentered with respect to each other. The reason for this is that the image surface formed by the ocular concave mirror is not merely a tilted plane but a surface which is curved as well as tilted. It is necessary in order to correct the tilted image surface into a flat surface to form the above-described decentered correcting optical system using complicatedly decentered curved surfaces.

The effect produced by adopting the above-described arrangement will be explained below with reference to FIG. 1, which shows the concept of the present invention. In the conceptual view of FIG. 1, reference numeral 1 denotes the observer's eyeball, and 2 the observer's iris position. Reference numerals 3 denotes an ocular concave mirror, and 4 the observer's visual axis. Reference numeral 5 denotes the image surface of an object at infinity formed by the ocular concave mirror 3. Reference numeral 6 denotes the visual axis that is reflected by the ocular concave mirror 3, and 8 a decentered correcting optical system. Reference numeral 9 denotes the optical axis exiting from the decentered correcting optical system 8, and 18 the image surface corrected by the decentered correcting optical system 8.

First, it is important that the decentered correcting optical system 8 should have a wedge-shaped configuration. As shown in FIG. 1, the wedge-shaped decentered correcting optical system 8 has optical path lengths which are unsymmetrical with respect to the visual axis 6, and hence functions so as to change the image surface 5, which is formed at a tilt to the visual axis 6, into an image surface 18 approximately perpendicular to the optical axis.

Next, the field curvature, which is symmetric about the visual axis, can be corrected as follows: To correct the field curvature, which is concave toward the relay optical system (not shown in FIG. 1), the 1-st surface $S_1$ of the decentered correcting optical system 8 is changed to a convex surface as shown by $S_2$ in FIG. 1, thereby correcting the above-described field curvature. Thus, the relay optical system is only required to project a flat image surface on the two-dimensional image display device. Accordingly, the load imposed on the relay optical system for aberration correction is reduced to a considerable extent. Thus, it becomes possible to form the system by using a relatively small-sized relay optical system.

FIG. 2 is a ray path diagram showing the function of the decentered correcting optical system according to the present invention. The figure shows the condition of correction made by the decentered correcting optical system in Embodiment 1 (described later). In FIG. 2, reference numeral 1 denotes the observer's eyeball, and 2 the observer's pupil position. Reference numeral 3 denotes an ocular concave mirror, and 4 the observer's visual axis. Reference numeral 5 denotes an image surface formed by the ocular concave mirror 3, and 8 a decentered correcting optical system disposed between the ocular concave mirror 3 and a relay optical system (not shown). Reference numeral 9 denotes the optical axis bent by the ocular concave mirror 3 and the decentered correcting optical system 8, and 7 the position where the observer's pupil 2 is projected by the ocular concave mirror 3 and the decentered correcting optical system 8. Reference numeral 18 denotes the image surface corrected by the ocular concave mirror 3 and the decentered correcting optical system 8. As will be clear from FIG. 2, the image surface 5 formed by the ocular concave mirror 3 is corrected into an image surface 18 which is flat as well as perpendicular to the optical axis 9 by the action of the decentered correcting optical system 8.

Thus, the decentered correcting optical system 8 having a decentered surface reduces the load on the relay optical system for aberration correction and makes it possible to realize an optical system for observation which satisfies the demand for high resolution while ensuring a large pupil diameter. It should be noted that it is important for the first and second surfaces of the decentered correcting optical system 8 to form a wedge-shaped configuration with respect to the axial light ray with a view to correcting the tilt of the image surface and providing an observation image of high resolution, as has been described above.

Further, since the ocular concave mirror 3 is disposed in a decentered position, it produces complicated astigmatism which is not rotationally symmetric with respect to the visual axis. To correct the complicated astigmatism, the decentered correcting optical system 8 is preferably formed using an anamorphic surface. With a view to correcting the astigmatism and providing an observation image of high resolution as far as the edges of visual field, it is necessary to arrange the decentered correcting optical system 8 so that refractive power in the X–Z plane, which is normal to the plane of FIG. 2, is smaller than refractive power in the Y–Z plane, which is parallel to the plane of the figure.

More preferably, the surface of the decentered correcting optical system 8 that faces the ocular concave mirror 3 should be formed from a convex surface from the viewpoint of aberration correction. By doing so, the 1-st surface of the decentered correcting optical system 8 is allowed to be conformable to the curve of the image surface 5. Consequently, the optical path length of light rays passing through the decentered correcting optical system 8 is shorter at the peripheries of field than at the vicinity of the optical axis, which is advantageous to the correction of field curvature. This arrangement is essential when the role of the decentered correcting optical system 8 in the correction of field curvature is relatively important.

More preferably, the decentration of the decentered correcting optical system and the decentration of the relay optical system should be combined together. By doing so, the aberration correction can be effected even more favorably, as a matter of course.

More preferably, the decentered correcting optical system or the ocular concave reflecting optical system should be formed by using an aspherical surface. By doing so, it is possible to correct the aberration of the pupil incident on the relay optical system, so that the load on the relay optical system for the aberration correction is reduced, and the relay optical system can be reduced in size, as in the case of the decentered correcting optical system 8 shown in FIG. 1.

More preferably, a part or the whole of the relay optical system should be disposed at a tilt to the optical axis 6 (see FIG. 1). By doing so, chromatic aberration produced in the decentered correcting optical system 8 can also be corrected by the relay optical system.

More preferably, the two-dimensional image display device is preferably disposed at a tilt so that the load on the decentered correcting optical system for correcting the tilt of the image surface is reduced and the chromatic aberration correction can be made even more effectively. With this arrangement, the overall performance becomes even more favorable.

Further, when the observer's pupil 2 is disposed at a position which is farther away from the ocular concave mirror 3, which constitutes the ocular concave reflecting optical system, than the front focus position of the concave mirror 3, it is possible to reduce the size of the image surface 5 formed by the ocular concave mirror 3. Accordingly, it becomes easy to avoid interference between the observer's head and the decentered correcting optical system 8. It is preferable to satisfy the following condition (1):

$$D > 0.5 \times F_R \qquad (1)$$

where $F_R$ is the focal length of the ocular concave mirror 3, and D is the distance from the ocular concave mirror 3 to the observer's pupil position 2.

If the lower limit of the condition (1) is not reached, the light rays reflected from the ocular concave mirror 3 extremely spread, causing an increase in the size of the decentered correcting optical system 8. Consequently, the decentered correcting optical system 8 interferes with the observer's head. In addition, the relay optical system increases in size, resulting in an increase in the overall size of the apparatus.

Further, if the distance between the ocular concave reflecting optical system 3 and the observer's iris or eyeball rolling position 2 is excessively short, since the ocular optical system 3 is disposed immediately in front of the observer's eyeball 1, it may be touched by the observer's eyelashes or terrify the observer. Therefore, it is desirable to dispose the ocular optical system 3 so that the distance D between the same and the observer's iris or eyeball rolling position 2 is longer than 30 mm. That is, it is preferable to satisfy the condition (2):

$$D > 30 [mm] \qquad (2)$$

Further, when the apparatus is arranged so that the visual axis is bent at 60° or more as in the arrangement according to the second aspect of the present invention, it is impossible to view an observation image which is clear as far as the edges of visual field due to the tilt of the image surface with respect to the visual axis after bending, which is caused by the ocular concave reflecting mirror and due to complicated astigmatism produced because the bundle of rays is obliquely incident on the concave reflecting mirror. It is important in order to correct the above-described aberration to satisfy the following condition (3):

$$R_{Y1}/R_{Y2} < 0.5 \qquad (3)$$

where $R_{Y1}$ and $R_{Y2}$ are the radii of curvature of the first and second surfaces of the decentered correcting optical system within the Y–Z plane (the plane containing the horizontal direction of the observer and his/her visual axis).

The condition (3) expresses refractive power in the Y–Z plane of the decentered correcting optical system. In the present invention, however, since the first and second surfaces of the decentered correcting optical system are decentered with respect to each other, strictly speaking, it is impossible to define refractive power. In the case of an optical system such as that in the present invention, if $R_{Y1}/R_{Y2}$ exceeds the upper limit of the condition (3), that is, if it is not smaller than 0.5, it is difficult to correct the strong field curvature produced by the ocular concave reflecting optical system particularly when the visual axis is bent at 60° or more by the action of the ocular concave mirror. The field curvature is produced by the concave mirror, and when the angle of bending is relatively small, the image surface is perpendicular to the visual axis after bending and has a gentle curvature. However, when the angle of bending exceeds 60°, both the tilt of the image surface with respect to the visual axis and the curvature increase beyond the limits of the ability of the relay optical system to correct the strong field curvature and the tilt of the image surface. When the limit of the condition (3) is exceeded, the decentered correcting optical system also becomes unable to correct the field curvature. Thus, it becomes impossible to obtain a flat and clear image for observation.

It should be noted that the visual display apparatus of the present invention, when used as a head-mounted visual display apparatus (HMD) 20, is mounted on the observer's head with a head band 21, for example, attached to the apparatus, as shown in a sectional view at FIG. 21(a) and in a perspective view at FIG. 21(b). In FIG. 21(a), reference numeral 3 denotes an ocular concave mirror, 8 a decentered correcting optical system. In addition, reference numeral 14 denotes a two-dimensional image display device (described later), and 15 a relay optical system (described later).

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 shows curvature of field produced by an ocular concave mirror of a visual display apparatus.

FIGS. 4(a) and 4(b) show the way in which the visual field is eclipsed by the rolling movement of the observer's eye.

FIG. 21(a) is a sectional view and FIG. 21(b) is a perspective view.

DESCRIPTION OF THE PREFERRED EMBODIMENTS

Embodiments 1 to 8 of the visual display apparatus according to the present invention will be described below.

Embodiment 1

Figure 1:
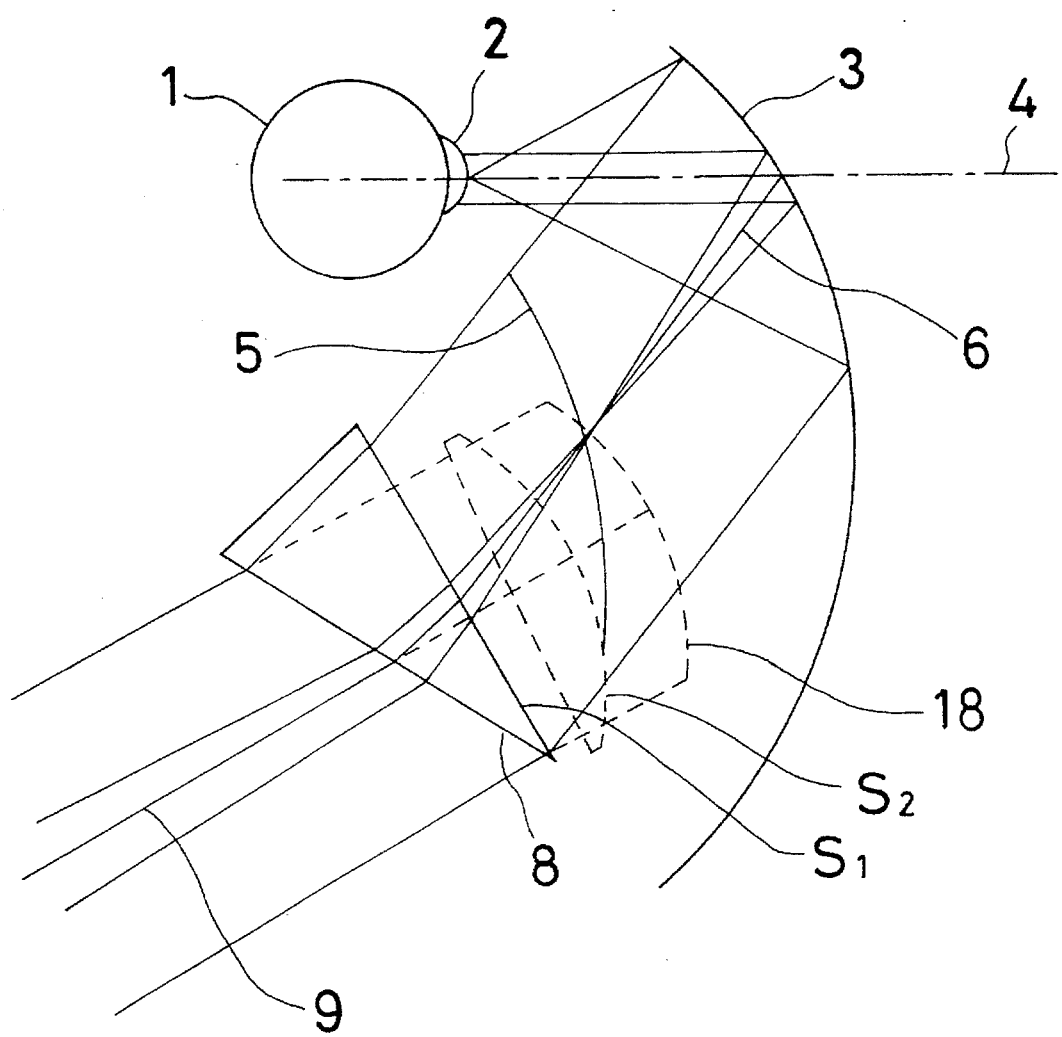
FIG. 1 is a conceptual view showing the visual display apparatus according to the present invention.
Figure 2:
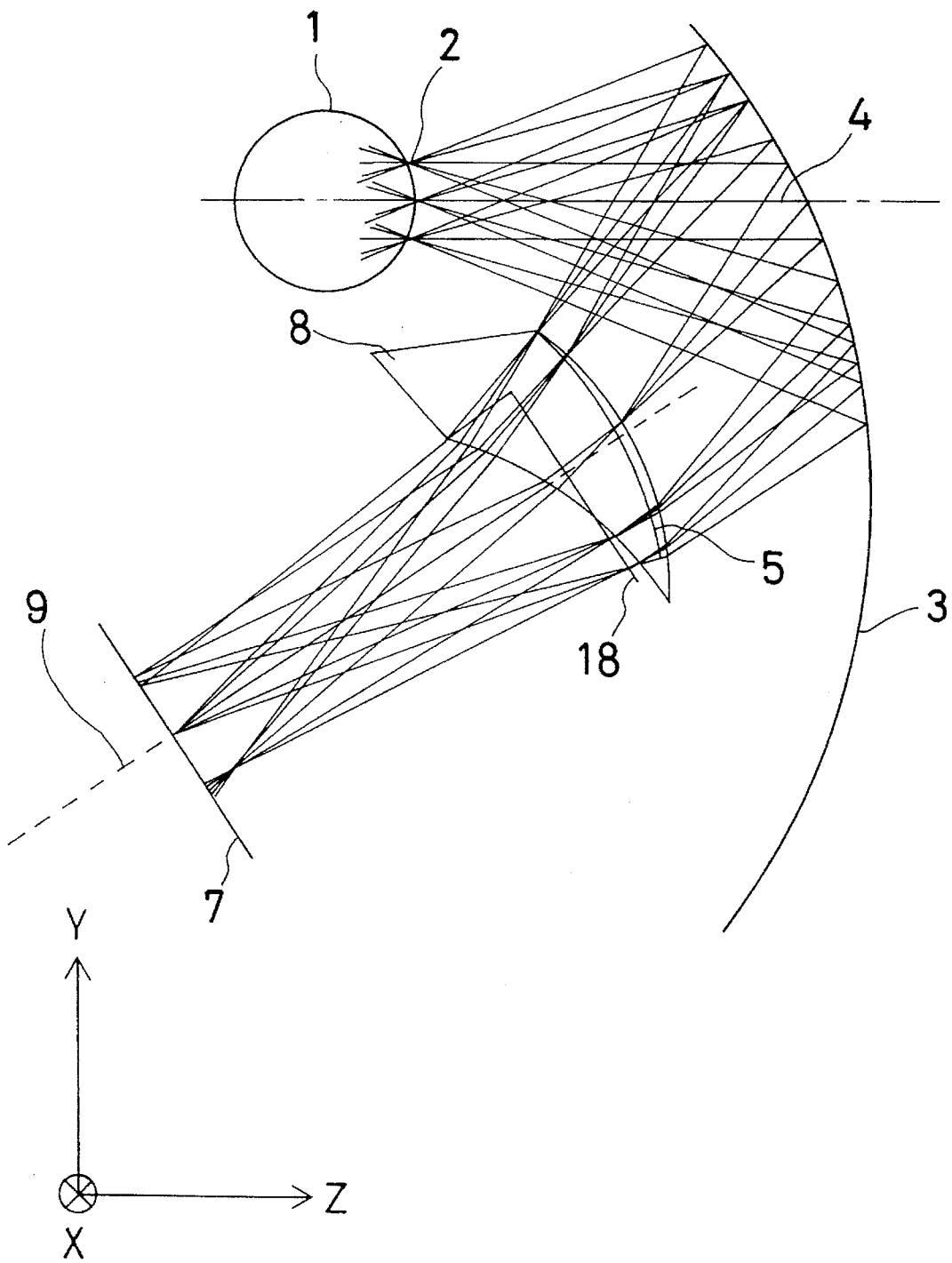
FIG. 2 is a ray path diagram showing a decentered correcting optical system used in the visual display apparatus according to the present invention.
Figure 5:
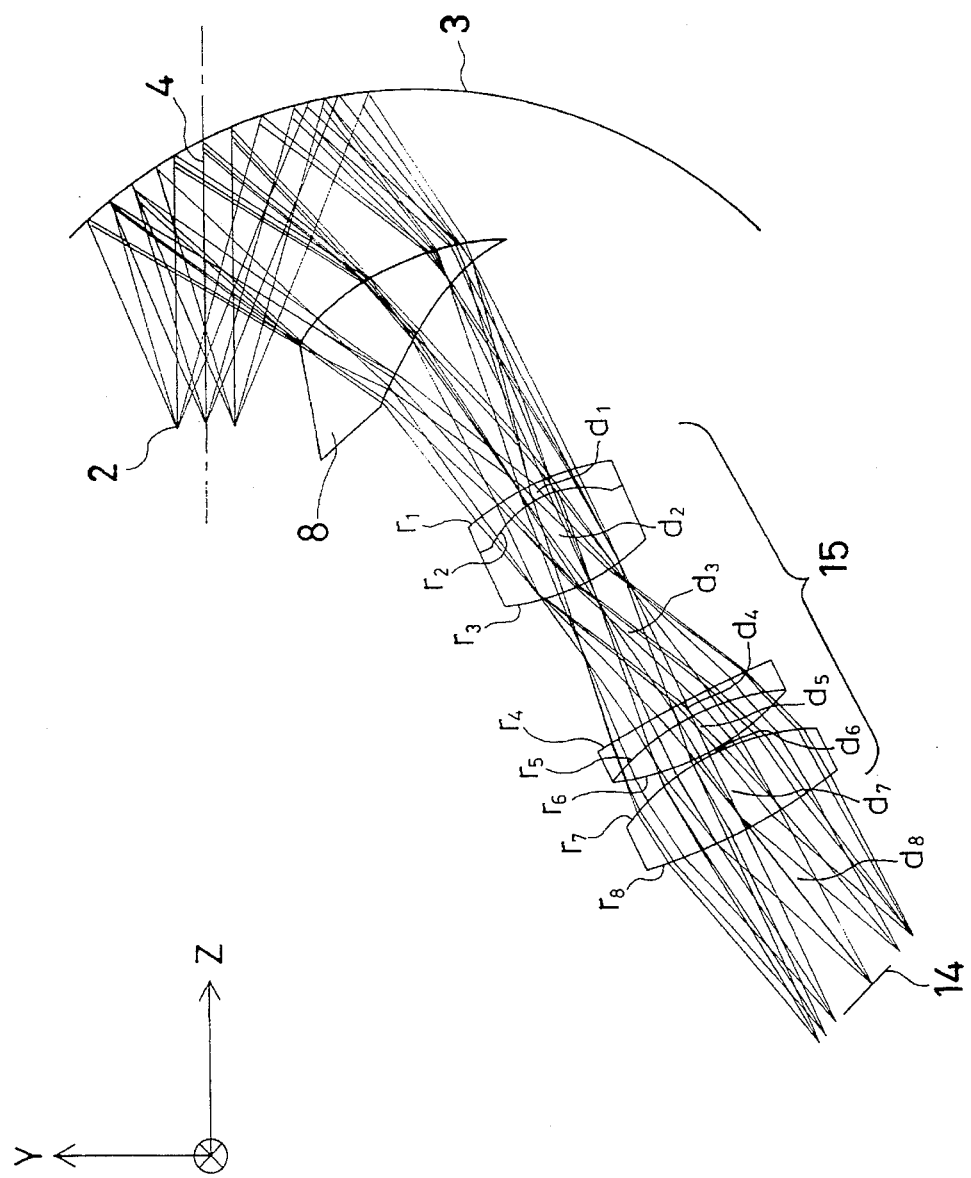
FIG. 5 is a sectional view showing the optical arrangement of Embodiment 1 of the present invention.

Embodiment 1 will be explained below with reference to FIG. 5. In the figure, reference numeral 2 denotes the observer's pupil position, and 4 the visual axis lying when the observer sees forward. Reference numeral 3 denotes an ocular concave mirror, and 8 a decentered correcting optical system. Reference numeral 15 denotes a relay optical system, and 14 a two-dimensional image display device.

A coordinate system is defined as illustrated in the figure. That is, the horizontal direction of the observer is taken as Y-axis, where the leftward direction is defined as positive direction; the direction of the observer's visual axis 4 is taken as Z-axis, where the direction toward the concave mirror 3 from the observer's eyeball is defined as positive direction; and the vertical direction of the observer is taken as X-axis, where the downward direction is defined as positive direction.

Constituent parameters of the optical system will be shown below. It should be noted that the surface Nos. are shown as ordinal numbers in backward tracing from the position of the exit pupil 2 toward the two-dimensional image display device 14.

As to the amount of decentration (eccentricity) and the tilt angle (inclination angle), the concave mirror 3 (surface No. 2) is given only an eccentricity in the Y-axis direction, which is a distance by which the vertex of the concave mirror 3 decenters in the Y-axis direction from the visual axis 4 (Z-axis) passing through the center of the exit pupil 2. The decentered correcting optical system 8 is given both a decentration and a tilt for each surface thereof: that is, an eccentricity of the vertex of each of the surfaces (surface Nos. 3 and 4) from the center of the exit pupil 2 in each of the Y- and Z-axis positive directions, and an angle of inclination of the central axis passing through the vertex of each surface with respect to the Z-axis. The inclination angle of the central axis of each surface is given with the angle of rotation from the axis of the positive direction of the Z-axis toward the axis of the positive direction of the Y-axis (in the counterclockwise direction as viewed in the figure) defined as angle in the positive direction. Regarding the relay optical system 15, the vertex position of the first surface (surface No. 5) thereof is given in the same way as in the case of each surface of the decentered correcting optical system 8. A central axis that passes through the vertex of the first surface (surface No. 5) is an optical axis, and the angle of inclination of this optical axis is given in the same way as the above. The eccentricity and inclination angle of a specific surface (surface No. 8) of the relay optical system 15 other than the first surface thereof are given as an eccentricity and inclination angle of the central axis (optical axis) passing through the vertex of this surface in a direction perpendicular to the optical axis of the preceding surface. A surface without indication of eccentricity and inclination angle is coaxial with respect to the preceding surface. The two-dimensional image display device 14 (surface No. 13) is given both an eccentricity as a distance by which the center thereof shifts from the center of the exit pupil 2 in the Y- and Z-axis positive directions, and an angle of inclination of the normal to the surface thereof with respect to the Z-axis direction.

When the coordinate system is set as illustrated in the figure and the paraxial curvature radius of each surface in a plane perpendicular to the Y–Z plane (the plane of the figure) is $R_x$, while the paraxial curvature radius in the Y–Z plane is $R_y$, the aspherical configuration of each surface may be expressed by.

$$Z = [(X^2/R_x) + (Y^2/R_y)]/[1 + \{1 - (1 + K_x)(X^2/R_x^2) - (1 + K_y)(Y^2/R_y^2)\}^{1/2}] + AR[(1 - AP)X^2 + (1 + AP)Y^2]^2 + BR[(1 - BP)X^2 + (1 + BP)Y^2]^3$$

where $K_x$ is the conical coefficient in the X-direction; $K_y$ is the conical coefficient in the Y-direction; AR and BR are rotationally symmetric 4th- and 6th-order aspherical coefficients, respectively; and AP and BP are asymmetric 4th- and 6th-order aspherical coefficients, respectively.

Regarding the surface separation, the spacing between the exit pupil 2 and the concave mirror 3 is shown as a distance in the Z-axis direction between the center of the exit pupil 2 and the vertex of the concave mirror 3, and the spacing between the 1-st surface of the relay optical system 15 and the image surface thereof (the two-dimensional image display device 14) is shown as a distance along the optical axis thereof. As to the relay optical system 15, the radii of curvature of the surfaces are denoted by $r_1$ to $r_i$, the surface separations by $d_1$ to $d_i$, the refractive indices for the spectral d-line by $n_1$ to $n_i$, and the Abbe's numbers by $\gamma_1$ to $\gamma_i$.

| Surface No. | | Radius of curvature | Surface separation | Refractive index (Eccentricity) | Abbe's No. (Inclination angle) |
|---|---|---|---|---|---|
| 1 (2) | | ∞(pupil) | 47.010 | | |
| 2 (3) | $R_y$ | −71.040 | 0 | Y: −29.891 | |
| | $R_x$ | −53.671 | | | |
| | $K_y$ | 0.059148 | | | |
| | $K_x$ | −0.136469 | | | |
| | AR | $0.360349 \times 10^{-7}$ | | | |
| | BR | $0.513037 \times 10^{-12}$ | | | |
| | AP | −0.648988 | | | |
| | BP | −0.313565 | | | |
| 3 (8) | $R_y$ | −53.284 | 0 | n = 1.554618 | v = 64.3 |
| | $R_x$ | −39.696 | | Y: −50.331 | −7.811° |
| | $K_y$ | 1.206766 | | Z: 25.359 | |
| | $K_x$ | 0.766839 | | | |
| | AR | $-0.134492 \times 10^{-6}$ | | | |
| | BR | 0 | | | |
| | AP | $-0.172095 \times 10^{+1}$ | | | |
| | BP | 0 | | | |
| 4 | $R_y$ | −42.641 | 0 | Y: −38.199 | 40.344° |
| | $R_x$ | −36.603 | | Z: 23.012 | |
| | $K_y$ | 0.399124 | | | |

-continued

| Surface No. | | Radius of curvature | | Surface separation | Refractive index (Eccentricity) | Abbe's No. (Inclination angle) |
|---|---|---|---|---|---|---|
| | $K_x$ | 2.956479 | | | | |
| | AR | $0.219886 \times 10^{-6}$ | | | | |
| | BR | 0 | | | | |
| | AP | $0.134389 \times 10^{+1}$ | | | | |
| | BP | 0 | | | | |
| 5 | $(r_1)$ | −32.003 | $(d_1)$ | −2 | $n_1 = 1.7466$ Y: −46.509 Z: 7.7456 | $v_1 = 36.2$ 24.174° |
| 6 | $(r_2)$ | −13.011 | $(d_2)$ | −13.735 | $n_2 = 1.5540$ | $v_2 = 63.7$ |
| 7 | $(r_3)$ | 34.716 | $(d_3)$ | −20.957 | | |
| 8 | $(r_4)$ | −171.983 | $(d_4)$ | −2 | $n_3 = 1.75458$ Y: −5.912 | $v_3 = 27.6$ 2.250° |
| 9 | $(r_5)$ | −28.012 | $(d_5)$ | −5.638 | $n_4 = 1.49815$ | $v_4 = 69.2$ |
| 10 | $(r_6)$ | 42.038 | $(d_6)$ | −0.5 | | |
| 11 | $(r_7)$ | −35.519 | $(d_7)$ | −11.257 | $n_5 = 1.64916$ | $v_5 = 55.1$ |
| 12 | $(r_8)$ | 99.244 | $(d_8)$ | −27.944 | | |
| 13 (14) | | ∞(image) | | | Y: −5.140 | 19.829° |

In the above-described embodiment, the horizontal angle of view is 45°, while the vertical angle of view is 34.65°, and the pupil diameter is 8 mm.

Figure 13:
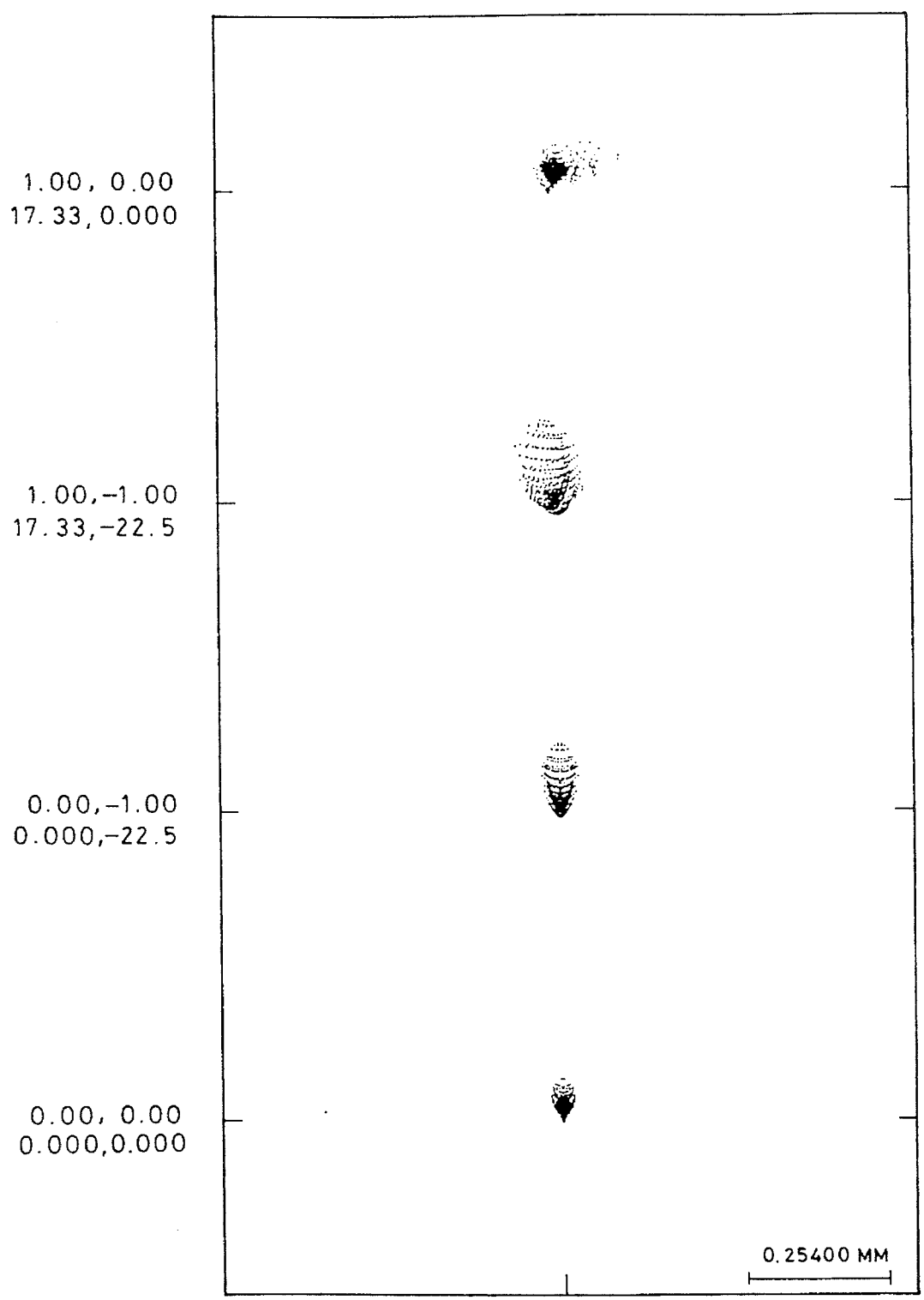
FIG. 13 is a spot diagram showing the condition of aberration correction in Embodiment 1.

FIG. 13 is a spot diagram showing the condition of aberration correction made in this embodiment. Among four numerals on the left-hand side of the spot diagram, the upper two numerals represent coordinates (X, Y) when the coordinates (X, Y) of a rectangular image plane are expressed as follows: The coordinates of the center of the image plane are (0.00, 0.00); the coordinates of the center of the right-hand edge thereof are (0.00, −1.00); the coordinates of the top right corner thereof are (1.00, −1.00); and the coordinates of the center of the top edge thereof are (1.00, 0.00). The lower two numerals represent X- and Y-components (expressed by degrees) of angle made by the coordinate axes (X, Y) with respect to the visual axis (the center of the image plane).

Embodiment 2

Figure 6:
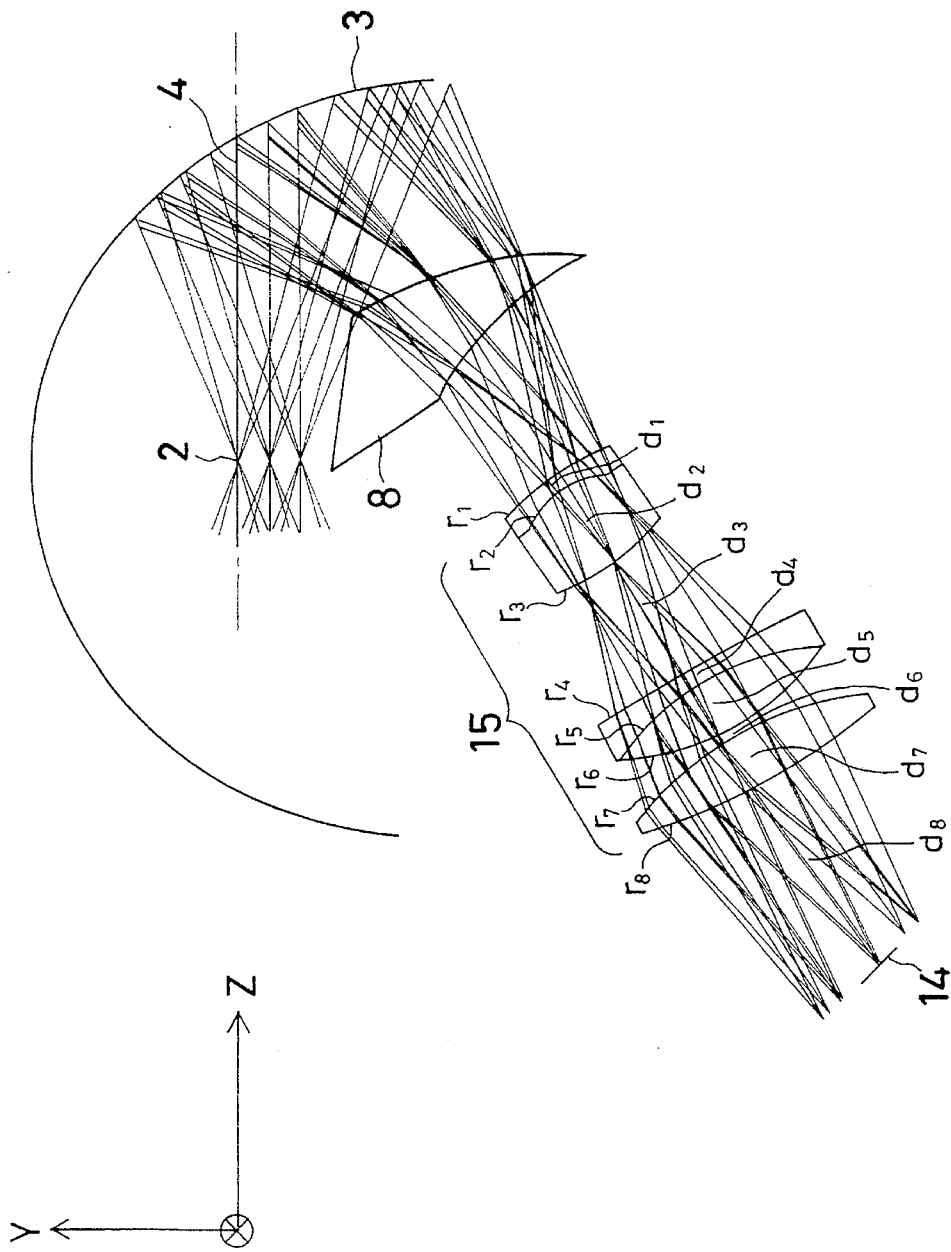
FIG. 6 is a sectional view showing the optical arrangement of Embodiment 2 of the present invention.

Embodiment 2 will be explained below with reference to FIG. 6. The arrangement of this embodiment is the same as in Embodiment 1 except that the ocular concave mirror 3 is a spheroidal mirror having the Y-axis as an axis of revolution.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 2 is also the same as Embodiment 1 in the way of defining a coordinate system, the way of giving an eccentricity and/or an inclination angle, and the way of giving a curvature radius, surface separation, refractive index and Abbe's number for each surface. The aspherical configuration of each surface is also the same as in Embodiment 1. As to the ocular concave mirror 3, the aspherical configuration may be expressed by.

$$Z=[(h^2/R)/[1+\{1-(1+K)(h^2/R^2)\}^{1/2}]+Ah^4+Bh^6 \ (h^2=X^2+Y^2)$$

where R is the radius of curvature; K is the conical coefficient; and A and B are 4th- and 6th-order aspherical coefficients, respectively.

| Surface No. | | Curvature radius | Surface separation | Refractive index (Eccentricity) | Abbe's No. (Inclination angle) |
|---|---|---|---|---|---|
| 1 (2) | | ∞(pupil) | 47.010 | | |
| 2 (3) | R | −41.559 | 0 | Y: 28.650 | 90° |
| | K | −0.209269 | | | |
| | A | 0 | | | |
| | B | 0 | | | |
| 3 (8) | $R_y$ | −58.649 | 0 | n = 1.487 Y: −51.790 Z: 24.925 | v = 70.4 −6.803° |
| | $R_x$ | −72.981 | | | |
| | $K_y$ | 1.167701 | | | |
| | $K_x$ | 13.533262 | | | |
| | AR | $0.433130 \times 10^6$ | | | |
| | BR | 0 | | | |
| | AP | $-0.154970 \times 10^{+1}$ | | | |
| | BP | 0 | | | |
| 4 | $R_y$ | −39.220 | 0 | Y: −38.119 Z: 21.847 | 38.781° |
| | $R_x$ | −40.106 | | | |
| | $K_y$ | 1.764612 | | | |
| | $K_x$ | 9.145229 | | | |
| | AR | $-0.608546 \times 10^6$ | | | |
| | BR | 0 | | | |
| | AP | $-0.264803 \times 10^{+1}$ | | | |
| | BP | 0 | | | |

-continued

| Surface No. | | Curvature radius | | Surface separation | Refractive index (Eccentricity) | Abbe's No. (Inclination angle) |
|---|---|---|---|---|---|---|
| 5 | $(r_1)$ | −41.419 | $(d_1)$ | −2 | $n_1 = 1.7393$<br>Y: −36.766<br>Z: −0.3364 | $v_1 = 28.3$<br>31.972° |
| 6 | $(r_2)$ | −12.892 | $(d_2)$ | −9.785 | $n_2 = 1.5680$ | $v_2 = 63.3$ |
| 7 | $(r_3)$ | 25.739 | $(d_3)$ | −16.142 | | |
| 8 | $(r_4)$ | −197.047 | $(d_4)$ | −2 | $n_3 = 1.7443$<br>Y: −5.6210 | $v_3 = 28.0$<br>−4.4371° |
| 9 | $(r_5)$ | −29.566 | $(d_5)$ | −7.963 | $n_4 = 1.5191$ | $v_4 = 67.2$ |
| 10 | $(r_6)$ | 35.243 | $(d_6)$ | −0.5 | | |
| 11 | $(r_7)$ | −39.239 | $(d_7)$ | −9.350 | $n_5 = 1.6552$ | $v_5 = 54.2$ |
| 12 | $(r_8)$ | 96.655 | $(d_8)$ | −29.206 | | |
| 13 (14) | | ∞(image) | | | Y: −1.865 | 20.979° |

In the above-described embodiment, the horizontal angle of view is 45°, while the vertical angle of view is 34.65°, and the pupil diameter is 8 mm.

Embodiment

Figure 7:
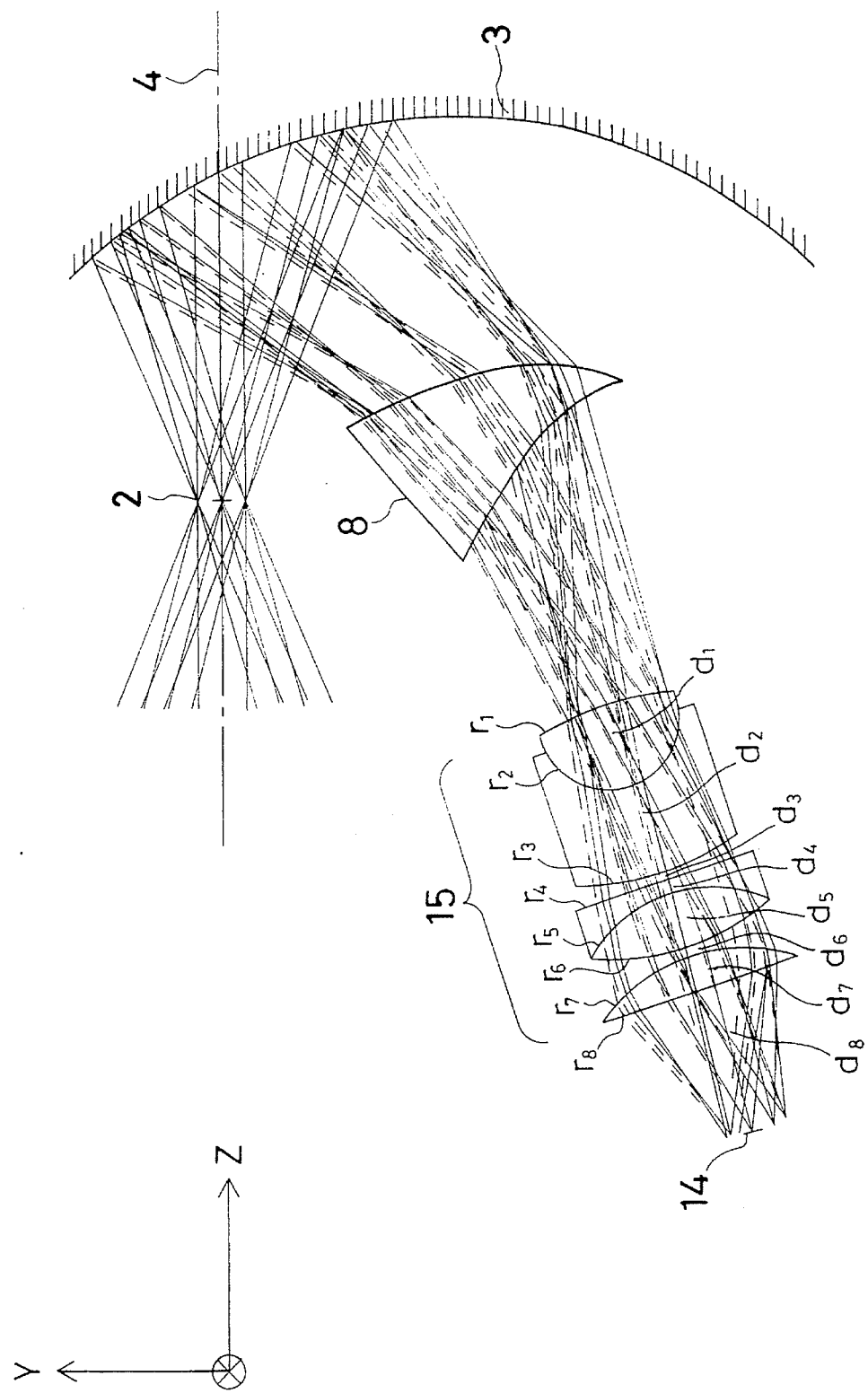
FIG. 7 is a sectional view showing the optical arrangement of Embodiment 3 of the present invention.

Embodiment 3 will be explained below with reference to FIG. 7. The arrangement of this embodiment is the same as in Embodiment 1.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 3 is also the same as Embodiment 1 in the way of defining a coordinate system, the way of giving an eccentricity and/or an inclination angle, and the way of giving a curvature radius, surface separation, refractive index and Abbe's number for each surface. The aspherical configuration is also the same as in Embodiment 1.

| Surface No. | | Curvature radius | | Surface separation | Refractive index (Eccentricity) | Abbe's No. (Inclination angle) |
|---|---|---|---|---|---|---|
| 1 (2) | | ∞(pupil) | | 46.462 | | |
| 2 (3) | | −64.708 | | 0 | Y: −27.347 | |
| 3 (8) | $R_y$ | −26.345 | | 0 | $n = 1.6516$<br>Y: −46.547<br>Z: 14.919 | $v = 58.5$<br>−15.054° |
| | $R_x$ | −309.984 | | | | |
| | $K_y$ | −1.243826 | | | | |
| | $K_x$ | 281.323532 | | | | |
| | AR | 0 | | | | |
| | BR | 0 | | | | |
| | AP | 0 | | | | |
| | BP | 0 | | | | |
| 4 | $R_y$ | −14.212 | | 0 | Y: −43.199<br>Z: 10.906 | 34.775° |
| | $R_x$ | 56.846 | | | | |
| | $K_y$ | −5.057 | | | | |
| | $K_x$ | −24.236217 | | | | |
| | AR | 0 | | | | |
| | BR | 0 | | | | |
| | AP | 0 | | | | |
| | BP | 0 | | | | |
| 5 | $(r_1)$ | −39.631 | $(d_1)$ | −10 | $n_1 = 1.5517$<br>Y: −47.054<br>Z: −25.910 | $v_1 = 47.1$<br>18.088° |
| 6 | $(r_2)$ | 8.830 | $(d_2)$ | −11.316 | $n_2 = 1.7541$ | $v_2 = 28.5$ |
| 7 | $(r_3)$ | 37.113 | $(d_3)$ | −1 | | |
| 8 | $(r_4)$ | −663.767 | $(d_4)$ | −2 | $n_3 = 1.755$ | $v_3 = 27.6$ |
| 9 | $(r_5)$ | −16.847 | $(d_5)$ | −7.08 | $n_4 = 1.6031$ | $v_4 = 60.7$ |
| 10 | $(r_6)$ | 24.972 | $(d_6)$ | −0.5 | | |
| 11 | $(r_7)$ | −21.105 | $(d_7)$ | −4.427 | $n_5 = 1.741$ | $v_5 = 52.7$ |
| 12 | $(r_8)$ | 1803.805 | $(d_8)$ | −18.488 | | |
| 13 (14) | | ∞(image) | | | | |

In the above-described embodiment, the horizontal angle of view is 45° while the vertical angle of view is 34.65°, and the pupil diameter is 6 mm.

Figure 15:
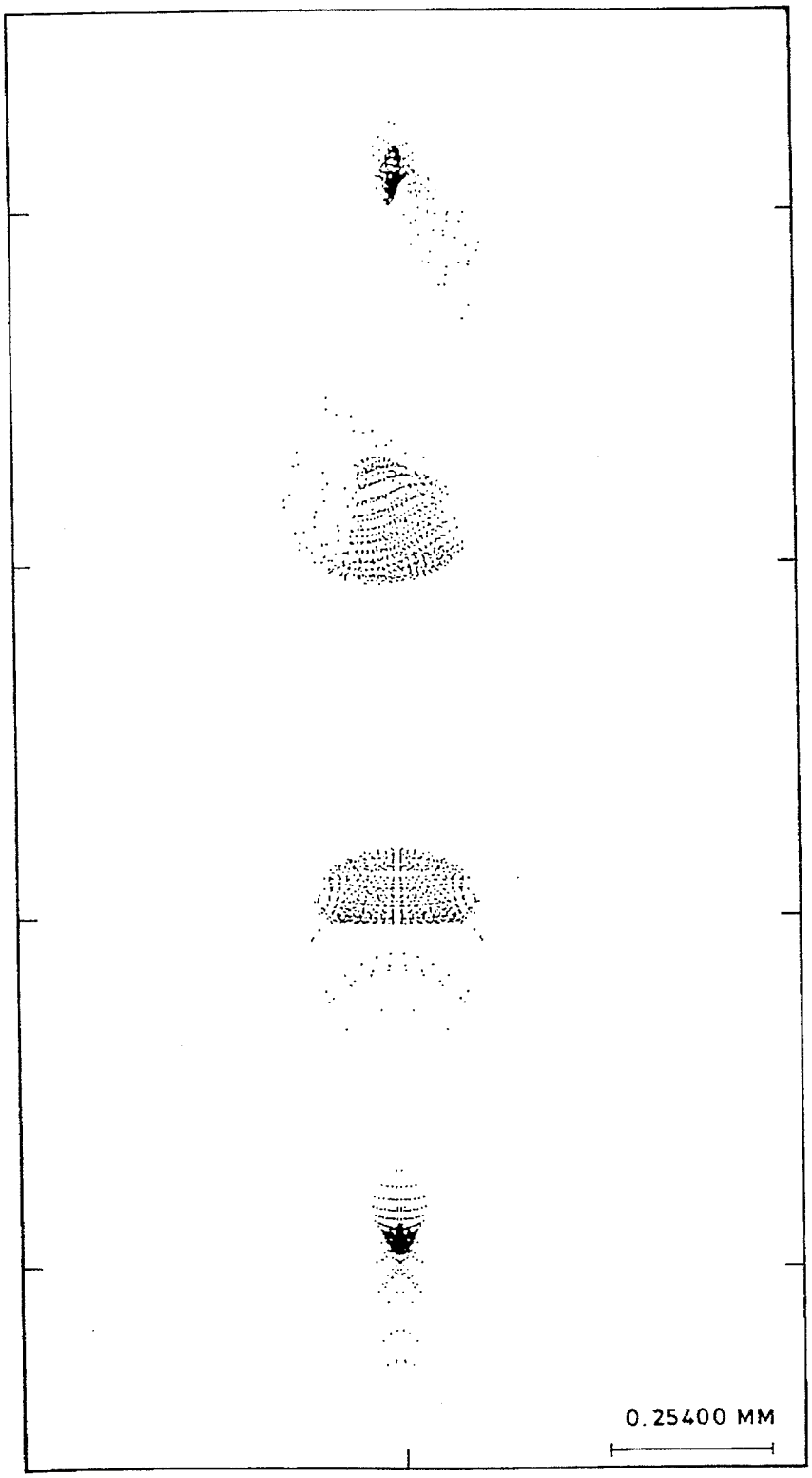
FIG. 15 is a spot diagram showing the condition of aberration correction in Embodiment 3.

FIG. 15 is a spot diagram showing the condition of aberration correction made in this embodiment in a similar manner to FIG. 13.

Embodiment 4

Figure 8:
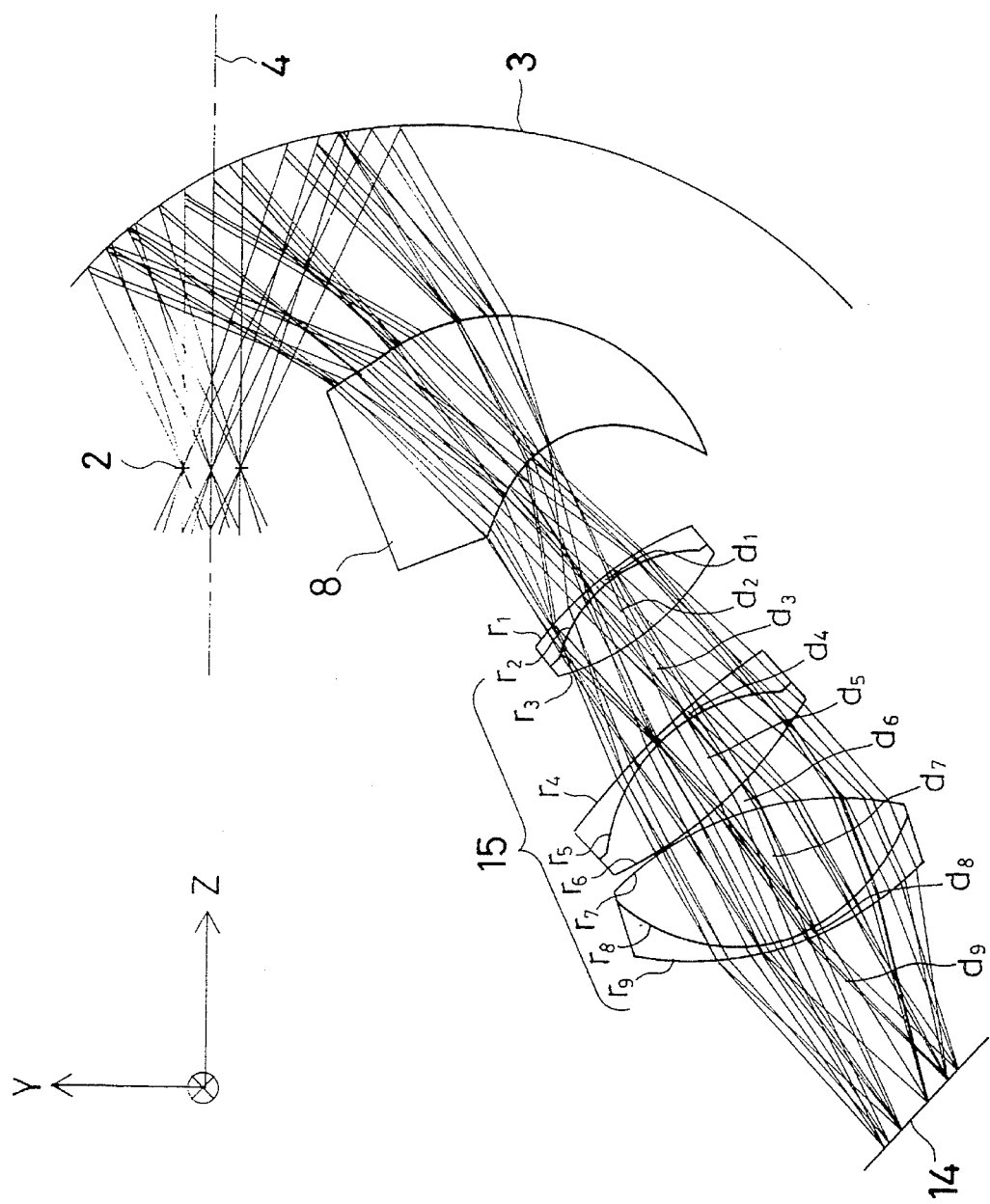
FIG. 8 is a sectional view showing the optical arrangement of Embodiment 4 of the present invention.

Embodiment 4 will be explained below with reference to FIG. 8. The arrangement of this embodiment is approximately the same as in Embodiment 1.

Figure 14:
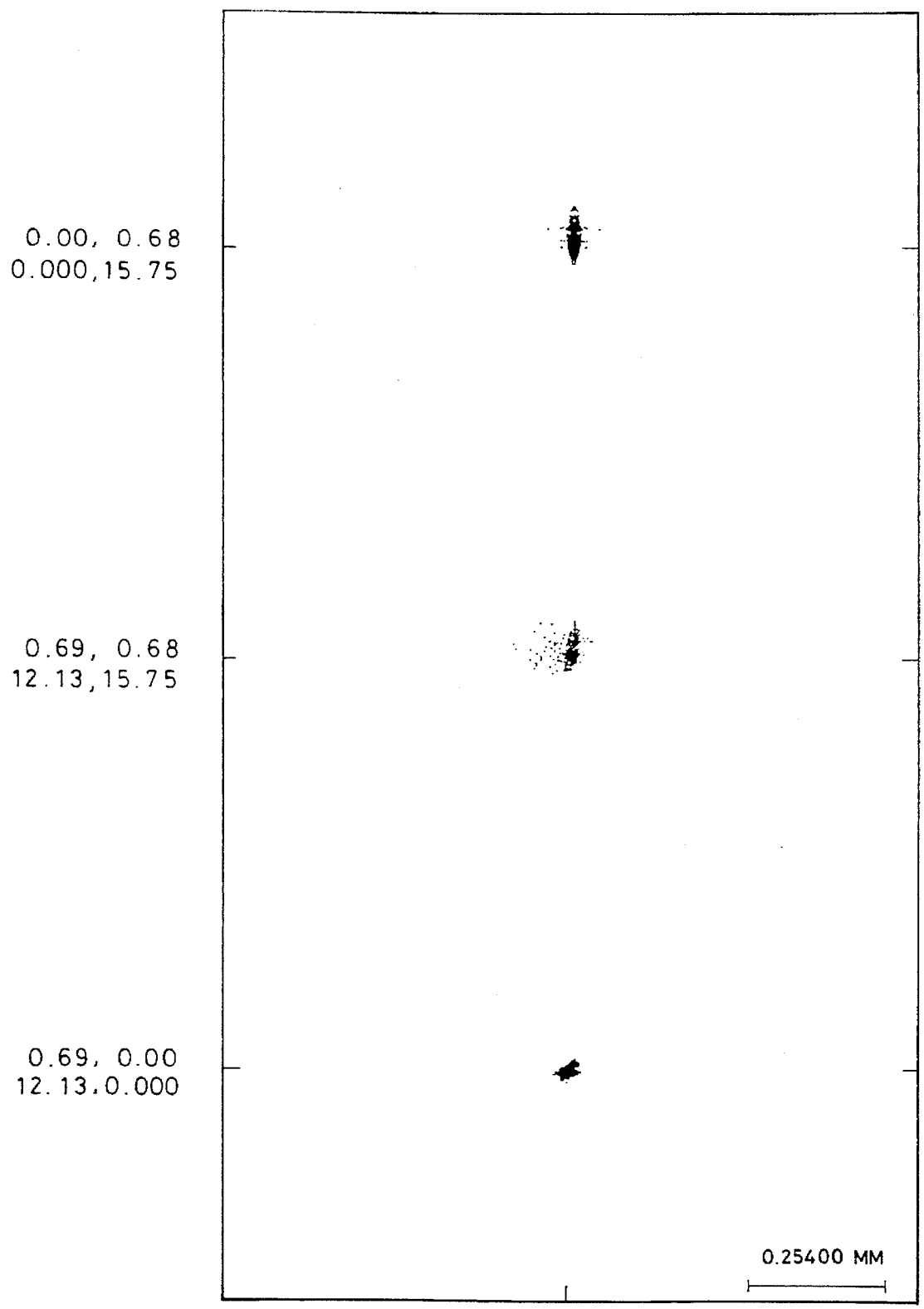
FIG. 14 is a spot diagram showing the condition of aberration correction in Embodiment 2.

Constituent parameters of the optical system in this embodiment will be shown below. It should be noted that the surface Nos. are shown as ordinal numbers in backward tracing from the position of the exit pupil 2 toward the FIG. 14 is a spot diagram showing the condition of aberration correction made in this embodiment in a similar manner to FIG. 13.

two-dimensional image display element 14. Embodiment 4 is also the same as Embodiment 1 in the way of defining a coordinate system, the way of giving an eccentricity and/or an inclination angle, and the way of giving a curvature radius, surface separation, refractive index and Abbe's number for each surface. The aspherical configuration is also the same as in Embodiment 1.

Embodiment 5

Figure 9:
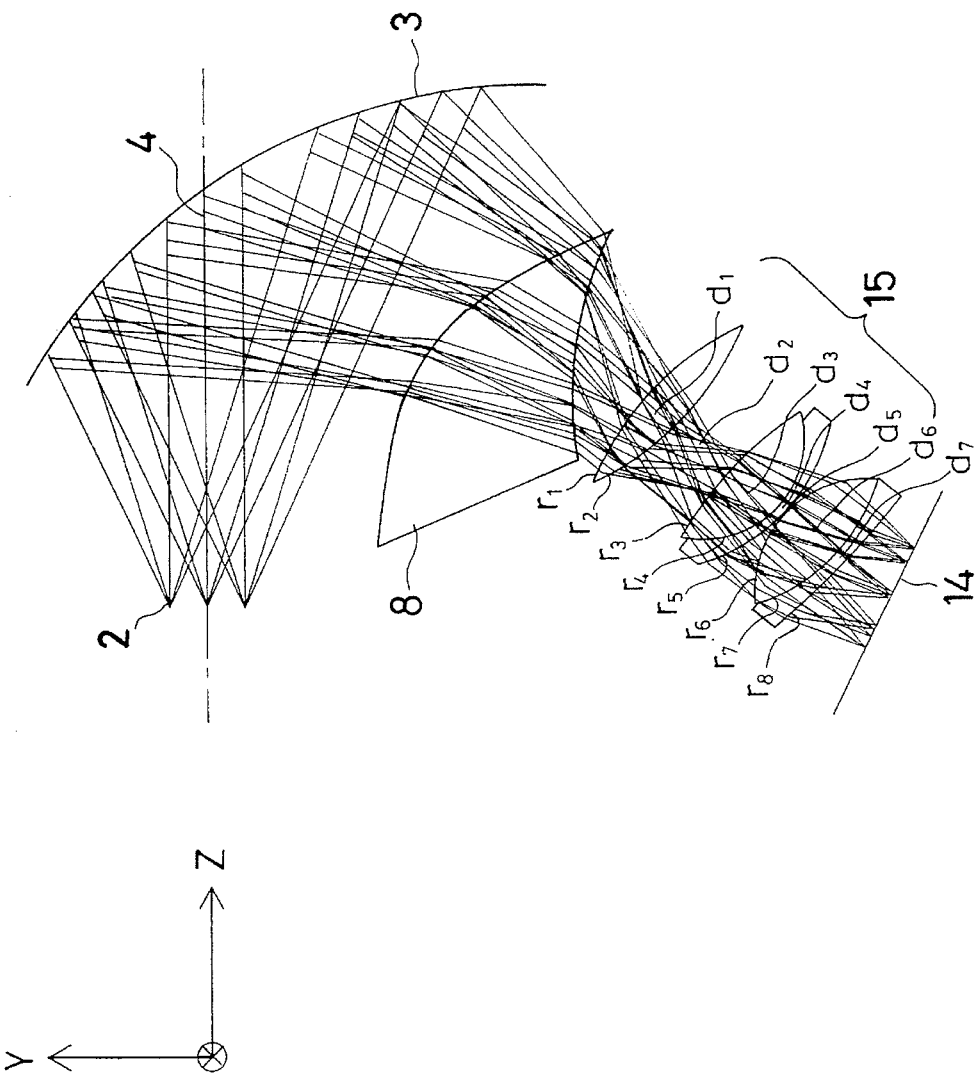
FIG. 9 is a sectional view showing the optical arrangement of Embodiment 5 of the present invention.

Embodiment 5 will be explained below with reference to FIG. 9. The arrangement of this embodiment is the same as in Embodiment 1.

| Surface No. | | Curvature radius | Surface separation | | Refractive index (Eccentricity) | Abbe's No. (Inclination angle) |
|---|---|---|---|---|---|---|
| 1 (2) | | ∞(pupil) | | 46.629 | | |
| 2 (3) | $R_y$ | −115.529 | | 0 | Y: −33.123 | |
|  | $R_x$ | −54.290 | | | | |
|  | $K_y$ | 0.523637 | | | | |
|  | $K_x$ | −1.860239 | | | | |
|  | AR | $-0.115605 \times 10^{-5}$ | | | | |
|  | BR | $-0.192986 \times 10^{-10}$ | | | | |
|  | AP | $-0.249219 \times 10^{-1}$ | | | | |
|  | BP | −0.994737 | | | | |
| 3 (8) | $R_y$ | −38.676 | | 0 | n = 1.6204 | ν = 60.3 |
|  | $R_x$ | −160.112 | | | Y: −49.396 | −16.592° |
|  | $K_y$ | 0.304512 | | | Z: 20.192 | |
|  | $K_x$ | 47.168010 | | | | |
|  | AR | $-0.102748 \times 10^{-4}$ | | | | |
|  | BR | $0.177721 \times 10^{-7}$ | | | | |
|  | AP | 0.359301 | | | | |
|  | BP | $-0.215675 \times 10^{-1}$ | | | | |
| 4 | $R_y$ | −13.121 | | 0 | Y: −50.637 | 19.980° |
|  | $R_x$ | −33.071 | | | Z: 5.481 | |
|  | $K_y$ | −0.838859 | | | | |
|  | $K_x$ | −3.037180 | | | | |
|  | AR | $0.370764 \times 10^{-5}$ | | | | |
|  | BR | $0.936964 \times 10^{-10}$ | | | | |
|  | AP | $0.148906 \times 10^{+1}$ | | | | |
|  | BP | 0.494624 | | | | |
| 5 | $(r_1)$ | −38.818 | $(d_1)$ | −1 | $n_1 = 1.7859$ | $ν_1 = 44.2$ |
|  | | | | | Y: −55.119 | 38.182° |
|  | | | | | (−42.582) | (48.558°) |
|  | | | | | Z: −13.859 | |
|  | | | | | (−4.663) | |
| 6 | $(r_2)$ | −18.672 | $(d_2)$ | −9 | $n_2 = 1.5163$ | $ν_2 = 64.1$ |
| 7 | $(r_3)$ | 33.694 | $(d_3)$ | −11.574 | | |
| 8 | $(r_4)$ | −98.075 | $(d_4)$ | −1 | $n_3 = 1.7618$ | $ν_3 = 26.6$ |
|  | | | | | Y: 7.422 | 5.524° |
| 9 | $(r_5)$ | −24.573 | $(d_5)$ | −12.075 | $n_4 = 1.5163$ | $ν_4 = 64.1$ |
| 10 | $(r_6)$ | 57.624 | $(d_6)$ | −3 | | |
| 11 | $(r_7)$ | −42.286 | $(d_7)$ | −18 | $n_5 = 1.6779$ | $ν_5 = 50.7$ |
|  | | | | | Y: −1.452 | −26.031° |
| 12 | $(r_8)$ | 24.749 | $(d_8)$ | −1 | $n_6 = 1.8052$ | $ν_6 = 25.4$ |
| 13 | $(r_9)$ | 48.671 | $(d_9)$ | 0 | | |
| 14 (14) | | ∞(image) | | | Y: −99.083 | 47.758° |
|  | | | | | Z: −85.700 | |

In the above-described embodiment, the horizontal angle of view is 50°, while the vertical angle of view is 35°, and the pupil diameter is 8 mm. It should be noted that the horizontal angle of view can be changed from 50° to 30° by moving the relay optical system 15 so as to attain the parenthesized numerical values for the eccentricity and inclination angle of the surface No. 5 in the above Table.

Figure 16:
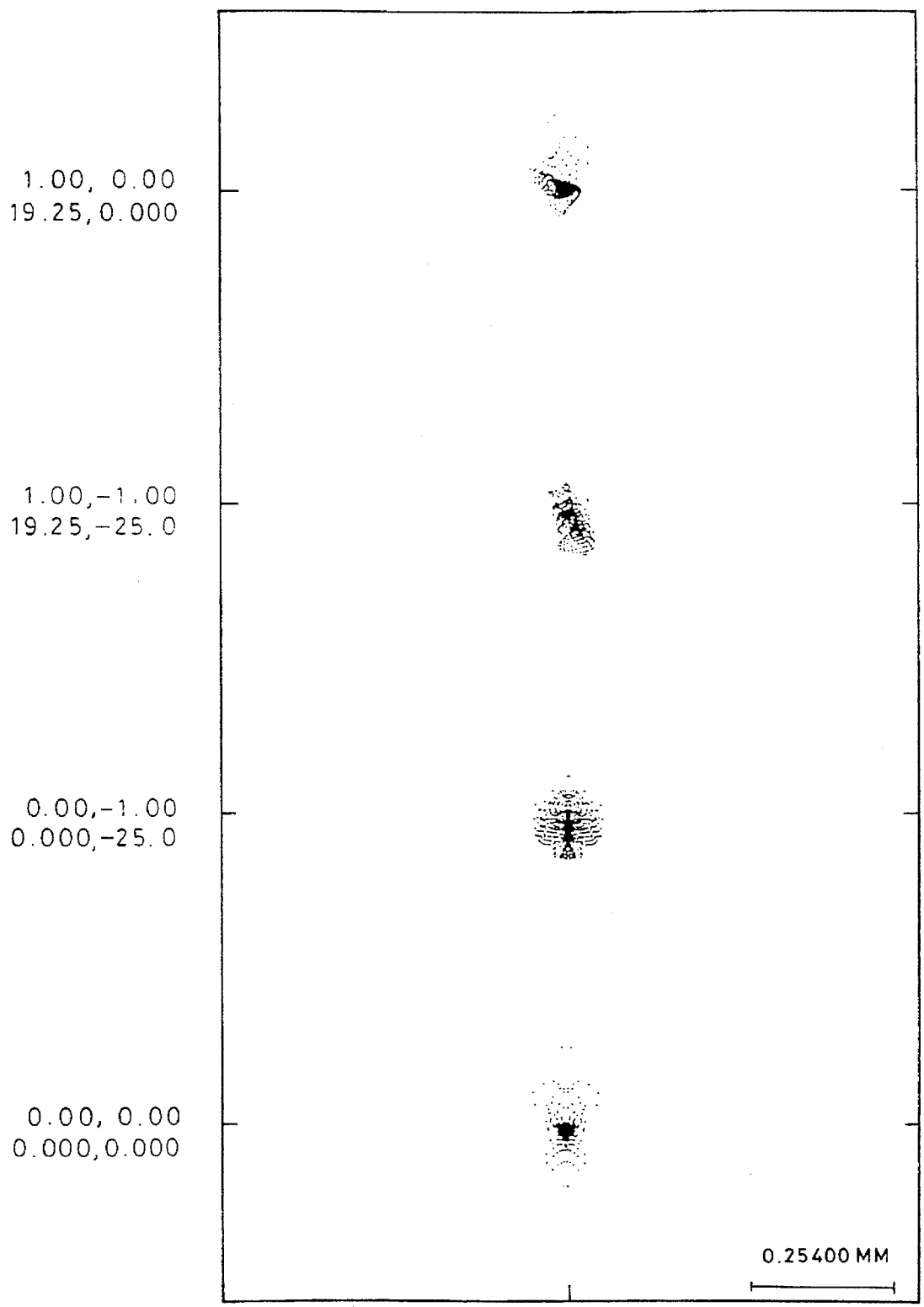
FIG. 16 is a spot diagram showing the condition of aberration correction in Embodiment 4 when the angle of view is relatively wide.
Figure 17:
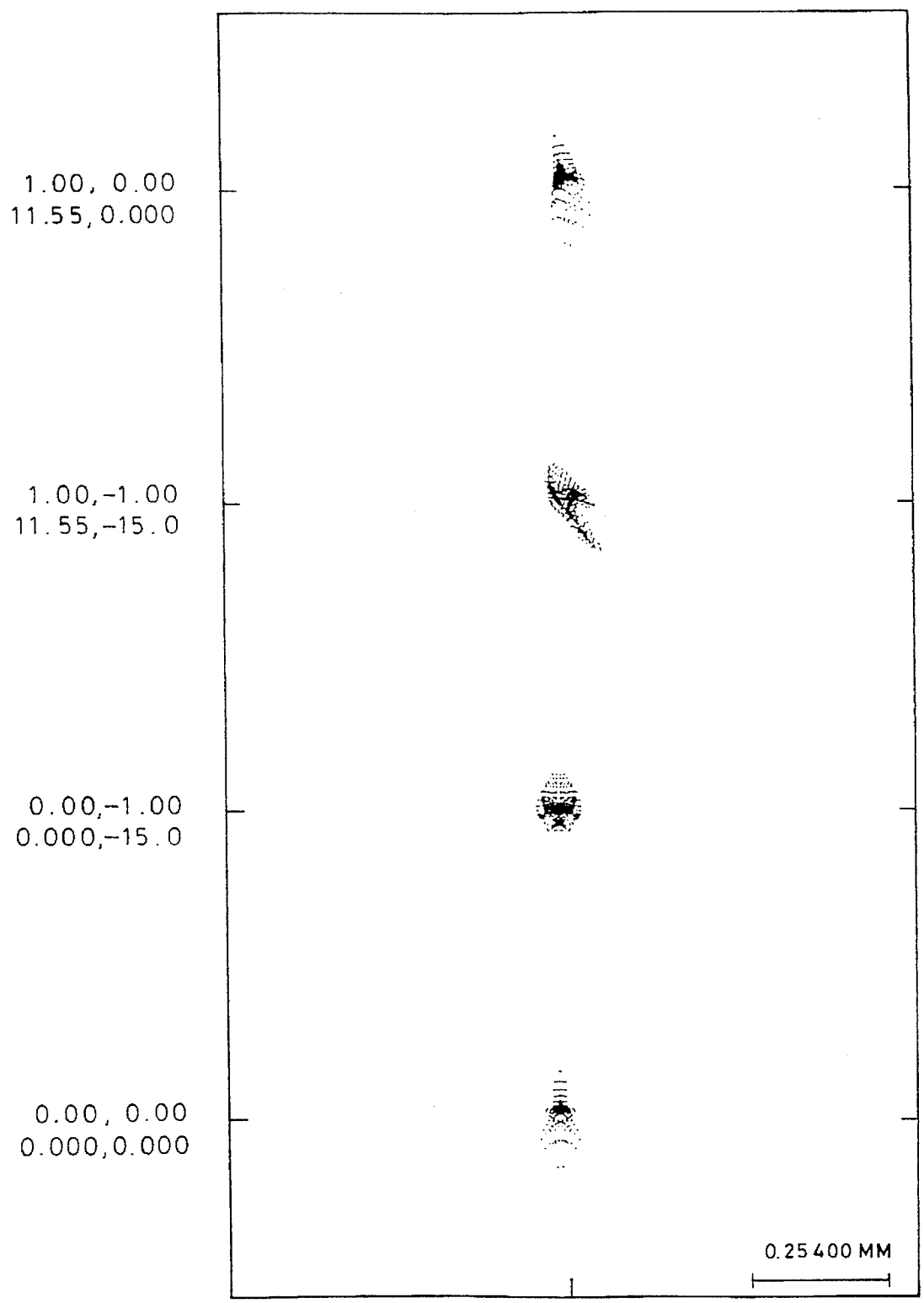
FIG. 17 is a spot diagram showing the condition of aberration correction in Embodiment 4 when the angle of view is relatively narrow.

FIGS. 16 and 17 are spot diagrams respectively showing the conditions of aberration correction made in this embodiment at a relatively wide angle of view and at a relatively narrow angle of view in a similar manner to FIG. 13.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 5 is also the same as Embodiment 1 in the way of defining a coordinate system, the way of giving an eccentricity and/or an inclination angle, and the way of giving a curvature radius, surface separation, refractive index and Abbe's number for each surface. The aspherical configuration is also the same as in Embodiment 1.

It should be noted that in any of the following Embodiments 5 to 8, the angle of bending by the ocular concave mirror 3 is 70°.

| Surface No. | | Curvature radius | | Surface separation | Refractive index (Eccentricity) | Abbe's No. (Inclination angle) |
|---|---|---|---|---|---|---|
| 1 (2) | | ∞(pupil) | | 59.485 | | |
| 2 (3) | $R_y$ | −77.651 | | 0 | Y: −6.338 | 29.485° |
| | $R_x$ | −49.777 | | | | |
| | $K_y$ | −0.742715 | | | | |
| | $K_x$ | −0.372467 | | | | |
| | AR | 0 | | | | |
| | BR | 0 | | | | |
| | AP | 0 | | | | |
| | BP | 0 | | | | |
| 3 (8) | $R_y$ | −20.792 | | 0 | n = 1.51633 | ν = 64.1 |
| | $R_x$ | −30.737 | | | Y: −30.315 | 52.929° |
| | $K_y$ | −3.245698 | | | Z: 34.578 | |
| | $K_x$ | 0.484215 | | | | |
| | AR | 0 | | | | |
| | BR | 0 | | | | |
| | AP | 0 | | | | |
| | BP | 0 | | | | |
| 4 | $R_y$ | −51.135 | | 0 | Y: −53.172 | 67.287° |
| | $R_x$ | −32.115 | | | Z: 46.245 | |
| | $K_y$ | 1.468440 | | | | |
| | $K_x$ | 3.808630 | | | | |
| | AR | 0 | | | | |
| | BR | 0 | | | | |
| | AP | 0 | | | | |
| | BP | 0 | | | | |
| 5 | $(r_1)$ | −35.955 | $(d_1)$ | −5.7401 | $n_1$ = 1.60311 | $\nu_1$ = 60.7 |
| | | | | | Y: −60.264 | 45.566° |
| | | | | | Z: 28.592 | |
| 6 | $(r_2)$ | 37.128 | $(d_2)$ | −9.087 | | |
| 7 | $(r_3)$ | −42.898 | $(d_3)$ | −8.175 | $n_2$ = 1.60311 | $\nu_2$ = 60.7 |
| 8 | $(r_4)$ | 13.539 | $(d_4)$ | −1 | $n_3$ = 1.80518 | $\nu_3$ = 25.4 |
| 9 | $(r_5)$ | 24.285 | $(d_5)$ | −0.1 | | |
| 10 | $(r_6)$ | −15.116 | $(d_6)$ | −8.885 | $n_4$ = 1.60311 | $\nu_4$ = 60.7 |
| 11 | $(r_7)$ | 22.339 | $(d_7)$ | −1 | $n_5$ = 1.80518 | $\nu_5$ = 25.4 |
| 12 | $(r_8)$ | 134.077 | $(d_8)$ | −7.851 | | |
| 13 (14) | | ∞(image) | | | Y: −1.030 | 17.642° |

$R_{Y1}/R_{Y2} = 0.4066$

In the above-described embodiment, the horizontal angle of view is 50°, while the vertical angle of view is 38.5°, and the pupil diameter is 10 mm.

Figure 18:
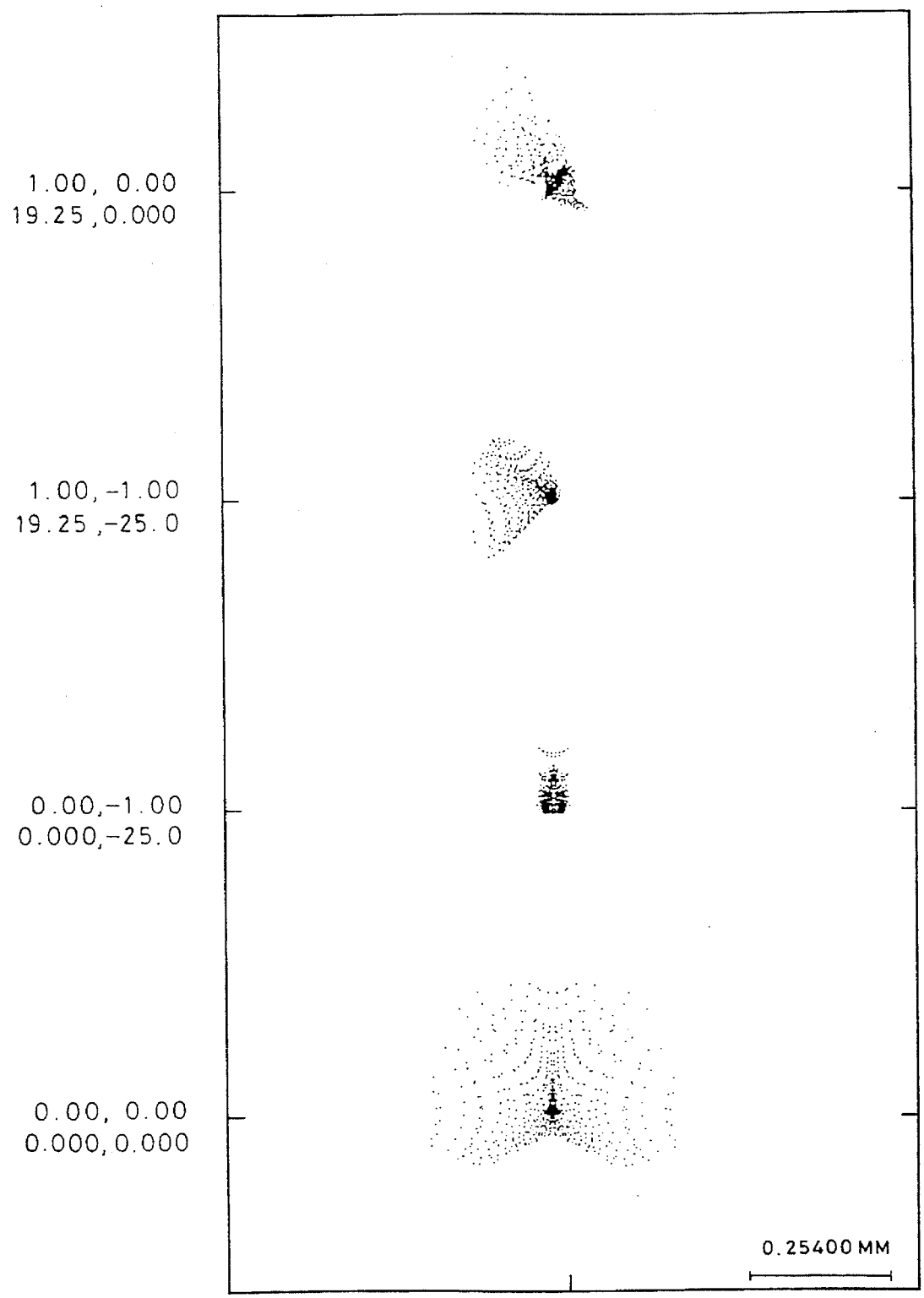
FIG. 18 is a part of a spot diagram showing the condition of aberration correction in Embodiment 5.
Figure 19:
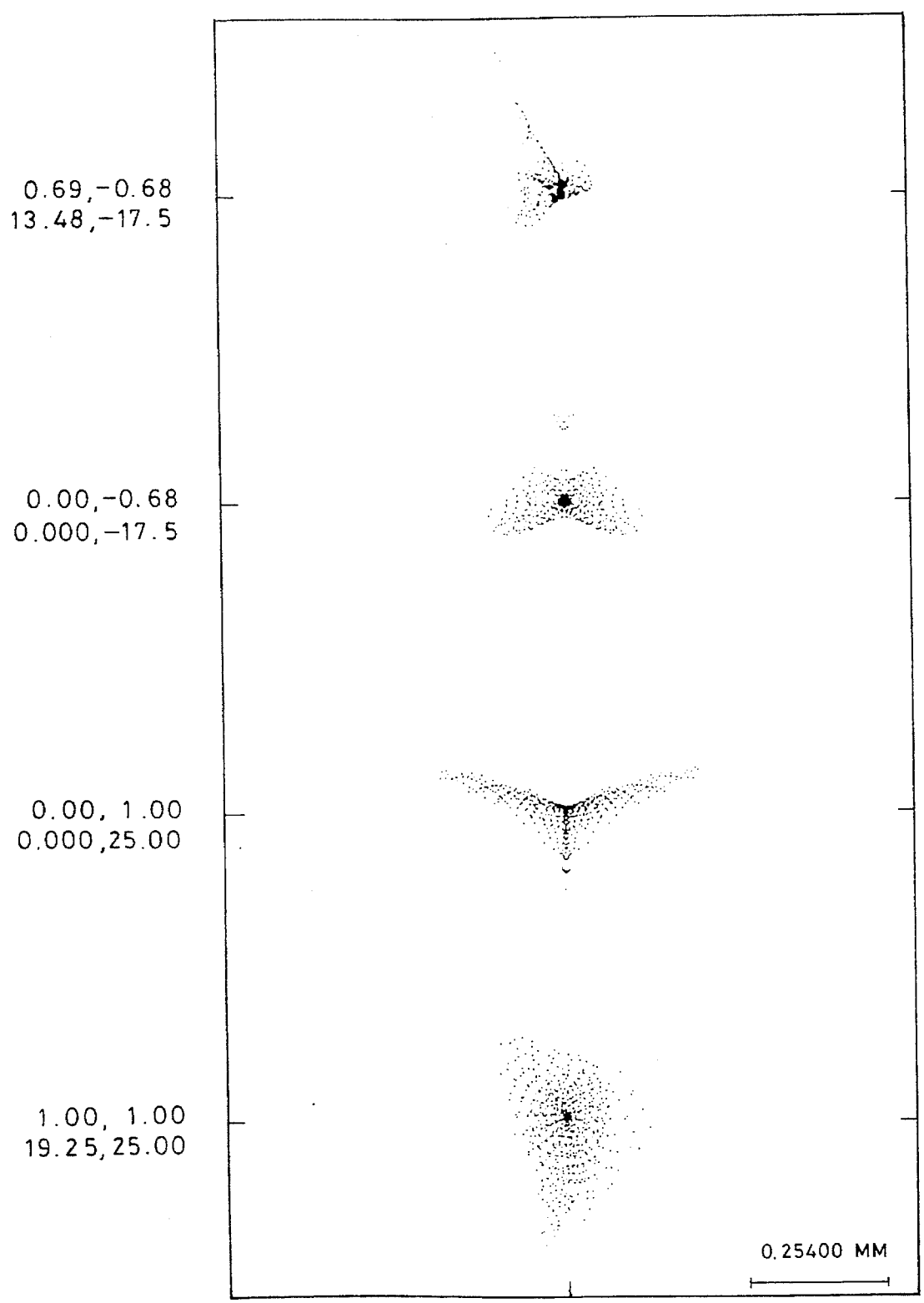
FIG. 19 is another part of the spot diagram showing the condition of aberration correction in Embodiment 5.
Figure 20:
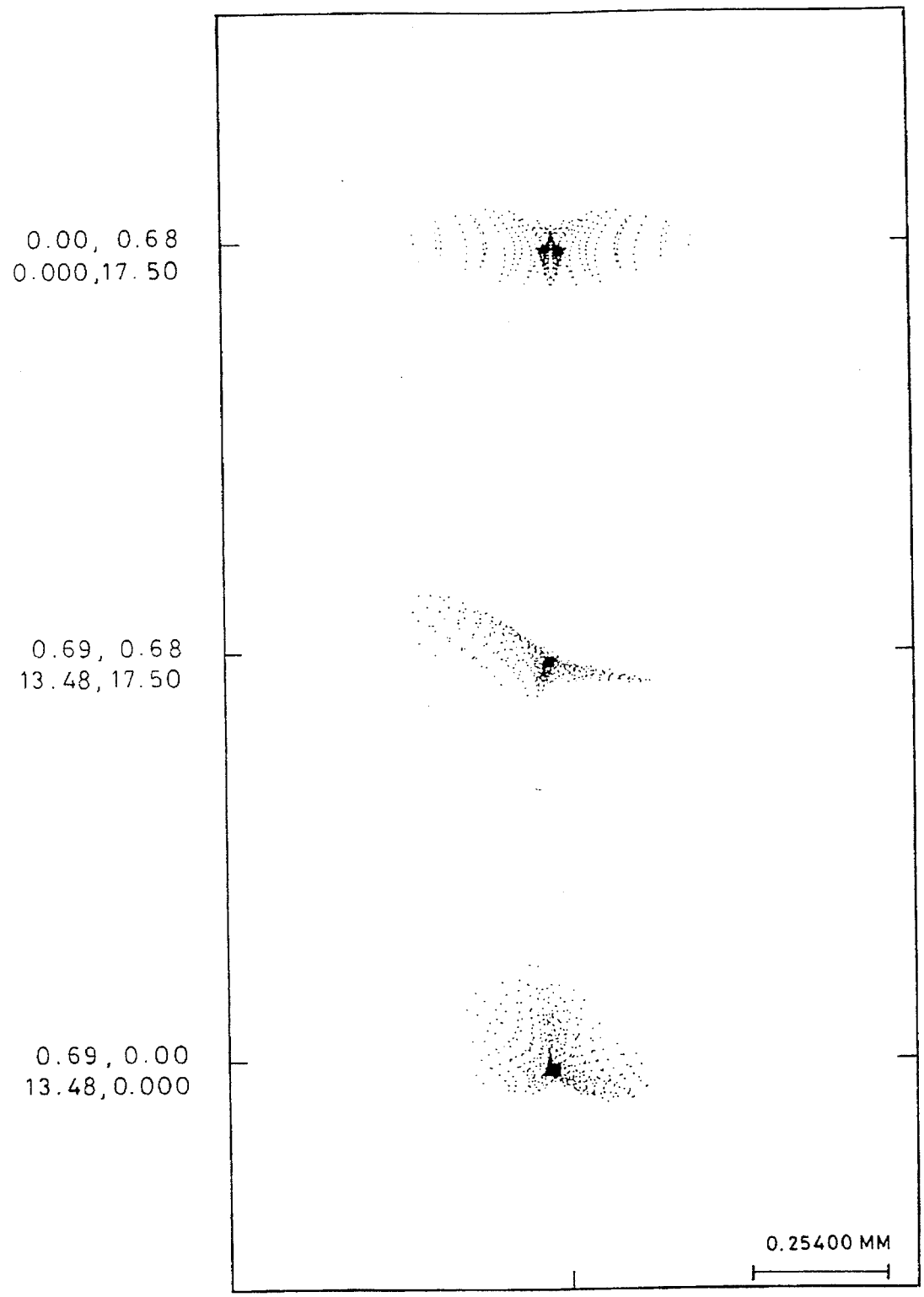
FIG. 20 is the other part of the spot diagram showing the condition of aberration correction in Embodiment 5.
Figure 21:
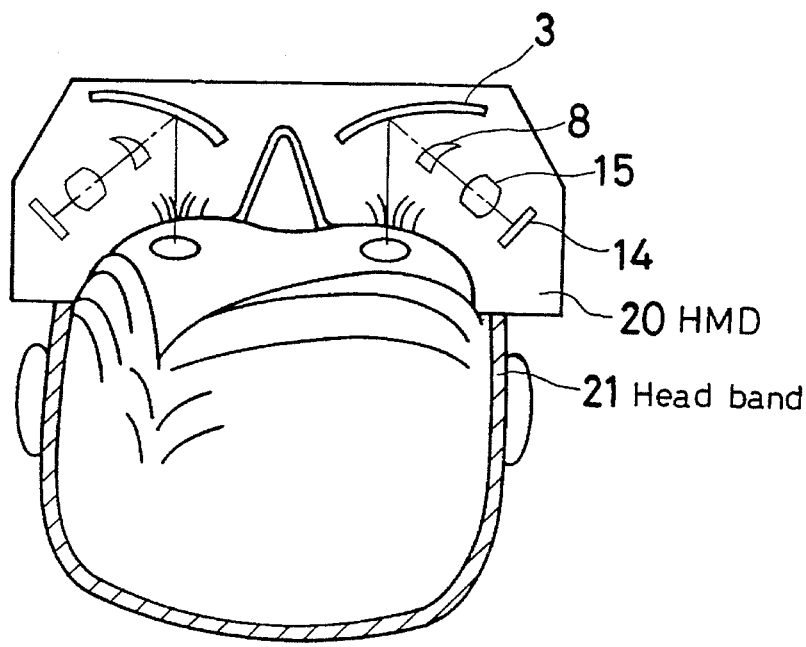
FIGS. 21(a) and 21(b) show the visual display apparatus of the present invention when used as a head-mounted visual display apparatus where
Figure 21:
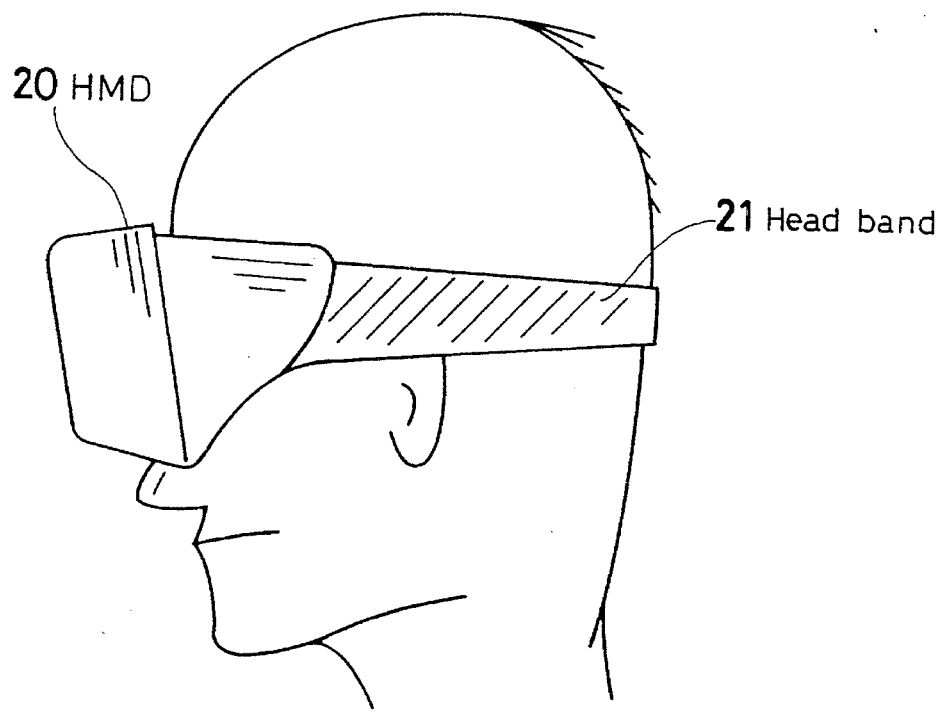
Figure 22:
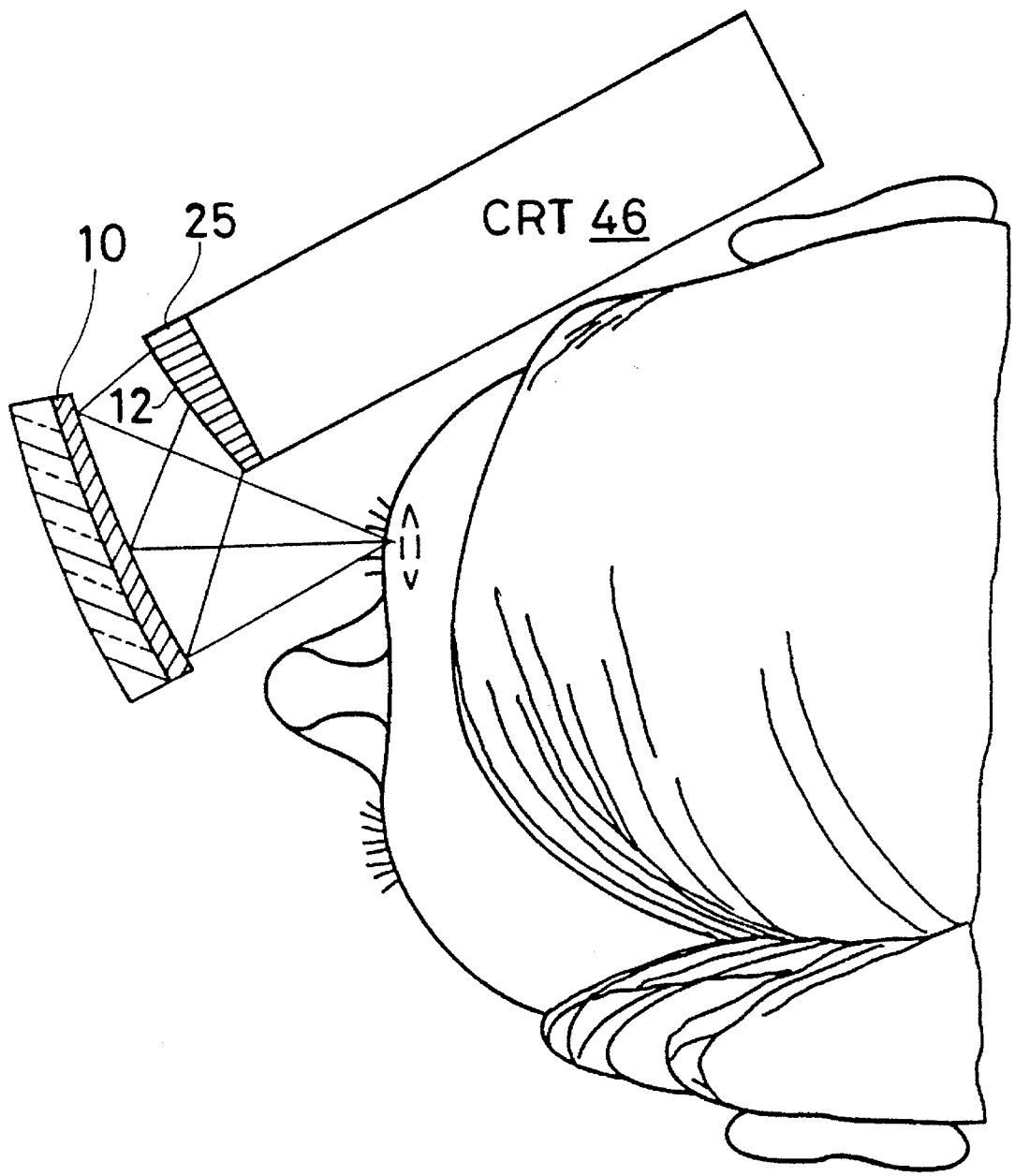
FIG. 22 is a plan view showing the arrangement of a conventional head-mounted visual display apparatus.
Figure 23:
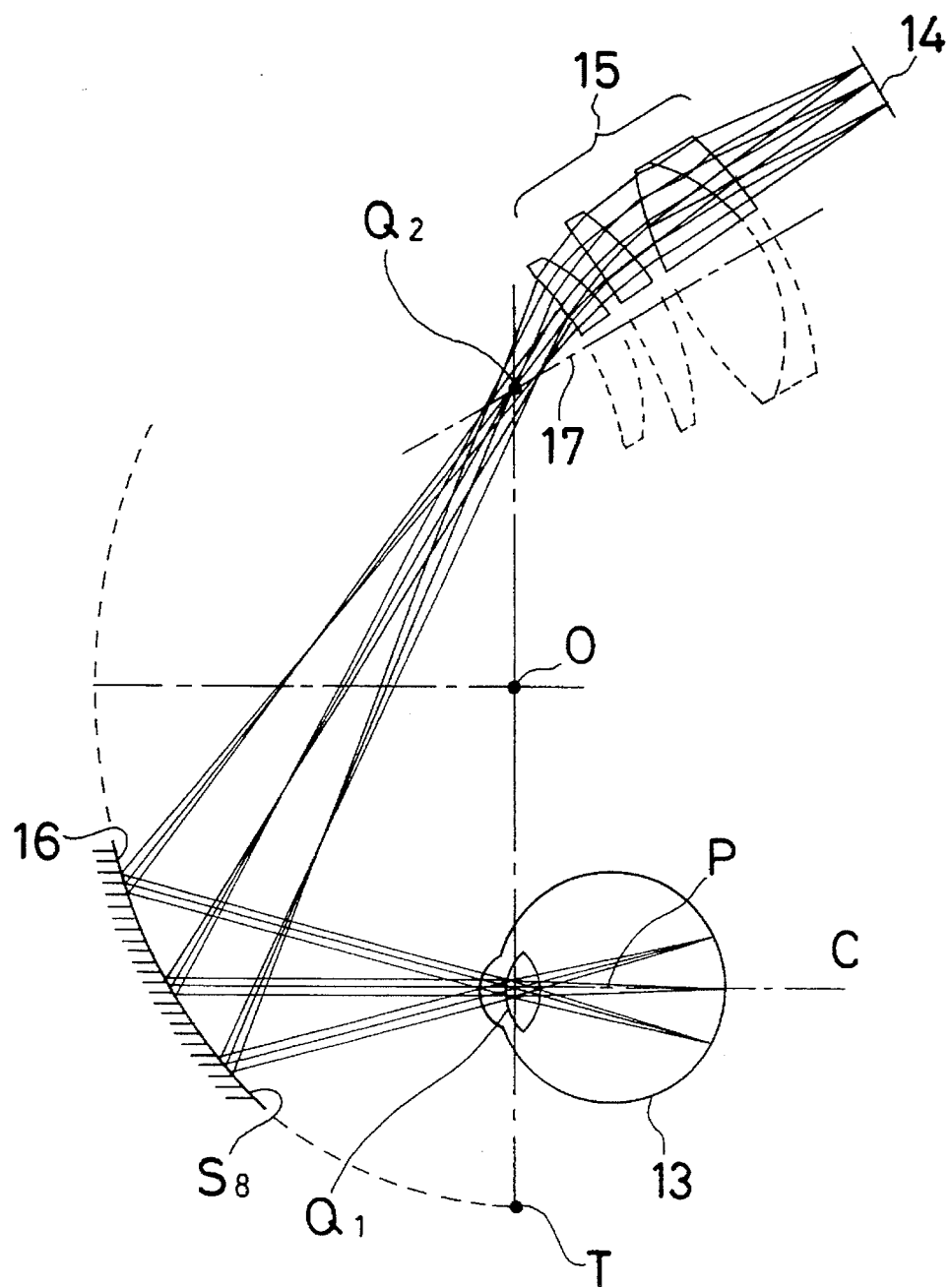
FIG. 23 is a sectional view showing the arrangement of a prior head-mounted visual display apparatus proposed by the present applicant.

FIGS. 18 to 20 are spot diagrams showing the condition of aberration correction made in this embodiment in a similar manner to FIG. 13.

Embodiment 6

Figure 10:
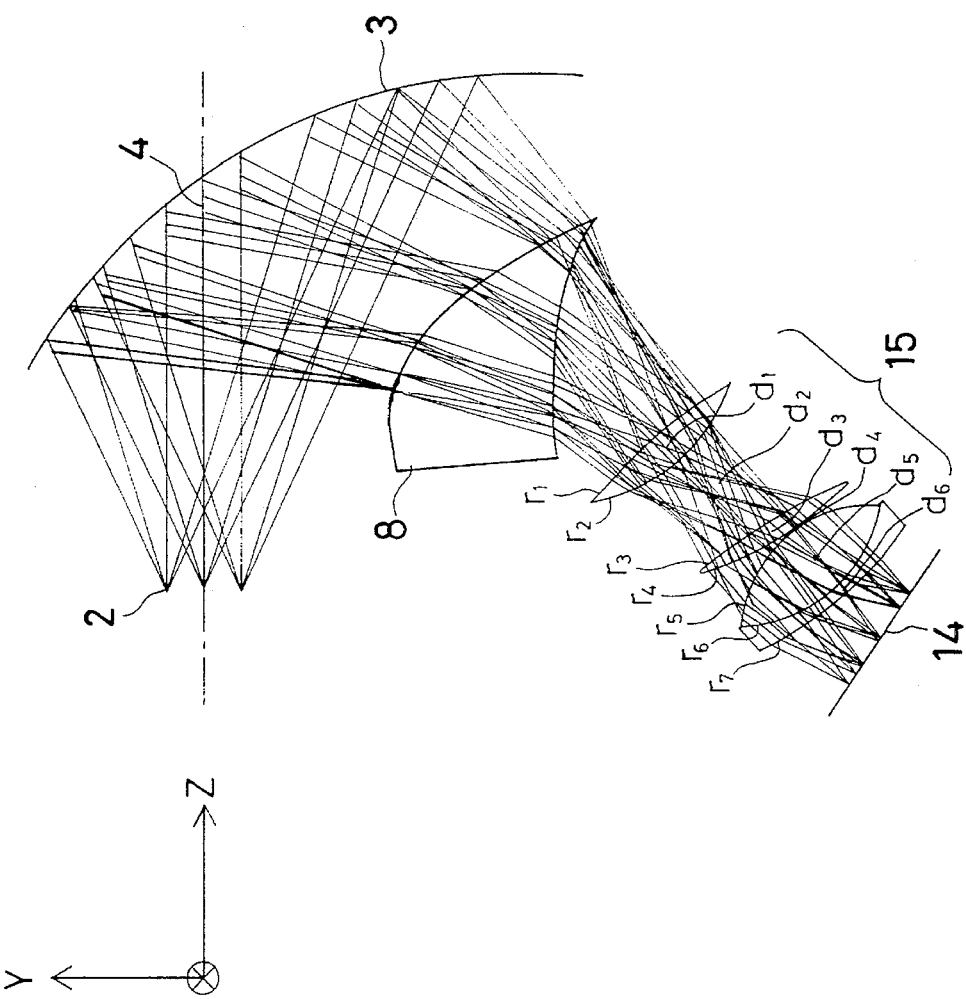
FIG. 10 is a sectional view showing the optical arrangement of Embodiment 6 of the present invention.

Embodiment 6 will be explained below with reference to FIG. 10. The arrangement of this embodiment is approximately the same as in Embodiment 1.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 6 is also the same as Embodiment 1 in the way of defining a coordinate system, the way of giving an eccentricity and/or an inclination angle, and the way of giving a curvature radius, surface separation, refractive index and Abbe's number for each surface. The aspherical configuration of each surface is also the same as in Embodiment 1. As to the relay optical system 15, the aspherical configuration may be given by the expression shown in Embodiment 2.

| Surface No. | | Curvature radius | Surface separation | Refractive index (Eccentricity) | Abbe's No. (Inclination angle) |
|---|---|---|---|---|---|
| 1 (2) | | ∞(pupil) | 60.816 | | |
| 2 (3) | $R_y$ | −77.651 | 0 | Y: −8.800 | 27.458° |
| | $R_x$ | −50.409 | | | |
| | $K_y$ | −0.878357 | | | |
| | $K_x$ | −0.672540 | | | |
| | AR | 0 | | | |
| | BR | 0 | | | |
| | AP | 0 | | | |
| | BP | 0 | | | |
| 3 (8) | $R_y$ | −17.110 | 0 | n = 1.51633 | ν = 64.1 |
| | $R_x$ | −47.766 | | Y: −25.755 | 75.295° |

| Surface No. | | Curvature radius | | Surface separation | Refractive index (Eccentricity) | Abbe's No. (Inclination angle) |
|---|---|---|---|---|---|---|
| | $K_y$ | −1.360137 | | | Z: 27.357 | |
| | $K_x$ | 5.460714 | | | | |
| | AR | 0 | | | | |
| | BR | 0 | | | | |
| | AP | 0 | | | | |
| | BP | 0 | | | | |
| 4 | $R_y$ | −47.337 | | 0 | Y: −48.146 | 76.445° |
| | $R_x$ | −38.588 | | | Z: 37.759 | |
| | $K_y$ | 2.800090 | | | | |
| | $K_x$ | 5.582655 | | | | |
| | AR | 0 | | | | |
| | BR | 0 | | | | |
| | AP | 0 | | | | |
| | BP | 0 | | | | |
| 5 | $(r_1)$ | −34.080 | $(d_1)$ | −5.476 | $n_1 = 1.51633$ | $v_1 = 64.1$ |
| | K | 0 | | | Y: −61.113 | 40.751° |
| | A | $0.389918 \times 10^{-4}$ | | | Z: 21.045 | |
| | B | $0.434491 \times 10^{-7}$ | | | | |
| 6 | $(r_2)$ | 22.097 | $(d_2)$ | −13.846 | | |
| | K | 0 | | | | |
| | A | $-0.141800 \times 10^{-4}$ | | | | |
| | B | $0.115543 \times 10^{-6}$ | | | | |
| 7 | $(r_3)$ | −90.067 | $(d_3)$ | −2.395 | $n_2 = 1.51633$ | $v_2 = 64.1$ |
| | | | | | Y: −3.827 | −10.283° |
| 8 | $(r_4)$ | 51.410 | $(d_4)$ | −0.1 | | |
| 9 | $(r_5)$ | −16.273 | $(d_5)$ | −10.090 | $n_3 = 1.60311$ | $v_3 = 60.7$ |
| | | | | | Y: −0.918 | 9.334° |
| 10 | $(r_6)$ | 19.173 | $(d_6)$ | −1 | $n_4 = 1.80518$ | $v_{4} = 25.4$ |
| 11 | $(r_7)$ | 55.216 | $(d_7)$ | −8.126 | | |
| 12 (14) | | ∞(image) | | | Y: −0.217 | 16.176° |

$R_{Y1}/R_{Y2} = 0.3615$

In the above-described embodiment, the horizontal angle of view is 50°, while the vertical angle of view is 38.5°, and the pupil diameter is 10 mm.

Figure 11:
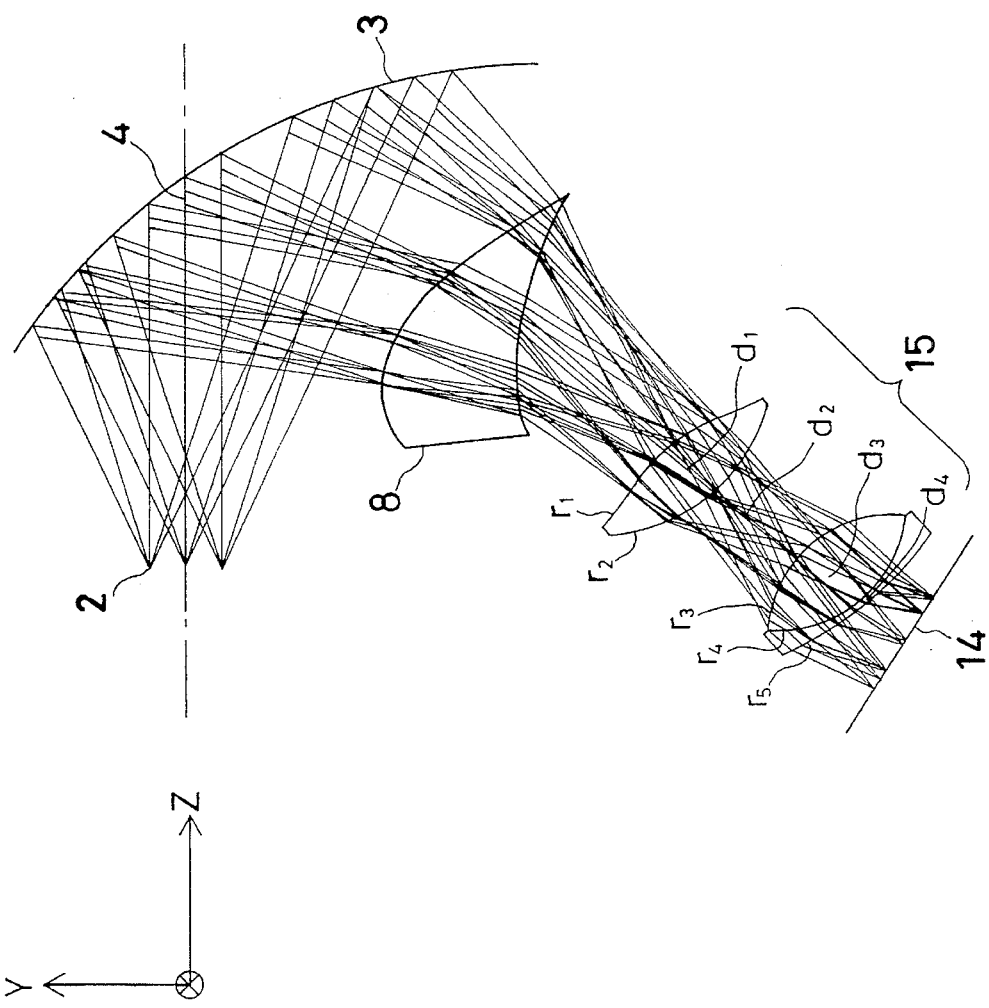
FIG. 11 is a sectional view showing the optical arrangement of Embodiment 7 of the present invention.

Embodiment 7:

Embodiment 7 will be explained below with reference to FIG. 11. The arrangement of this embodiment is approximately the same as in Embodiment 6.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 7 is also the same as Embodiment 6 in the way of defining a coordinate system, the way of giving an eccentricity and/or an inclination angle, and the way of giving a curvature radius, surface separation, refractive index and Abbe's number for each surface. The aspherical configuration is also the same as in Embodiment 6.

| Surface No. | | Curvature radius | Surface separation | Refractive index (Eccentricity) | Abbe's No. (Inclination angle) |
|---|---|---|---|---|---|
| 1 (2) | | ∞(pupil) | 60.230 | | |
| 2 (3) | $R_y$ | −80.972 | 0 | Y: −7.654 | 28.655° |
| | $R_x$ | −51.556 | | | |
| | $K_y$ | −0.868497 | | | |
| | $K_x$ | −0.539374 | | | |
| | AR | 0 | | | |
| | BR | 0 | | | |
| | AP | 0 | | | |
| | BP | 0 | | | |
| 3 (8) | $R_y$ | −11.437 | 0 | $n = 1.51633$ | $v = 64.1$ |
| | $R_x$ | −31.949 | | Y: −27.643 | 96.656° |
| | $K_y$ | −0.916345 | | Z: 24.394 | |
| | $K_x$ | 0.350858 | | | |
| | AR | 0 | | | |
| | BR | 0 | | | |
| | AP | 0 | | | |
| | BP | 0 | | | |
| 4 | $R_y$ | −45.201 | 0 | Y: −48.795 | 70.106° |

-continued

| Surface No. | | Curvature radius | Surface separation | | Refractive index (Eccentricity) | Abbe's No. (Inclination angle) |
|---|---|---|---|---|---|---|
| | $R_x$ | −33.081 | | | Z: 41.953 | |
| | $K_y$ | 2.664361 | | | | |
| | $K_x$ | 3.133791 | | | | |
| | AR | 0 | | | | |
| | BR | 0 | | | | |
| | AP | 0 | | | | |
| | BP | 0 | | | | |
| 5 | $(r_1)$ | −25.39504 | $(d_1)$ | −9.116 | $n_1 = 1.51633$ | $v_1 = 64.1$ |
| | K | 0 | | | Y: −68.080 | 39.749° |
| | A | $0.326222 \times 10^{-4}$ | | | Z: 17.195 | |
| | B | $0.125536 \times 10^{-7}$ | | | | |
| 6 | $(r_2)$ | 20.93214 | $(d_2)$ | −14.008 | | |
| | K | 0 | | | | |
| | A | $-0.224574 \times 10^{-4}$ | | | | |
| | B | $0.176739 \times 10^{-7}$ | | | | |
| 7 | $(r_3)$ | −17.27805 | $(d_3)$ | −10.874 | $n_2 = 1.60311$ | $v_2 = 60.7$ |
| | | | | | Y: −6.411 | −0.236° |
| 8 | $(r_4)$ | 18.239 | $(d_4)$ | −1 | $n_3 = 1.80518$ | $v_3 = 25.4$ |
| 9 | $(r_5)$ | 41.362 | $(d_5)$ | −7.442 | | |
| 10 (14) | | ∞(image) | | | Y: −0.228 | 18.218° |

$R_{Y1}/R_{Y2} = 0.2530$

In the above-described embodiment, the horizontal angle of view is 50°, while the vertical angle of view is 38.5°, and the pupil diameter is 10 mm.

Embodiment 8

Figure 12:
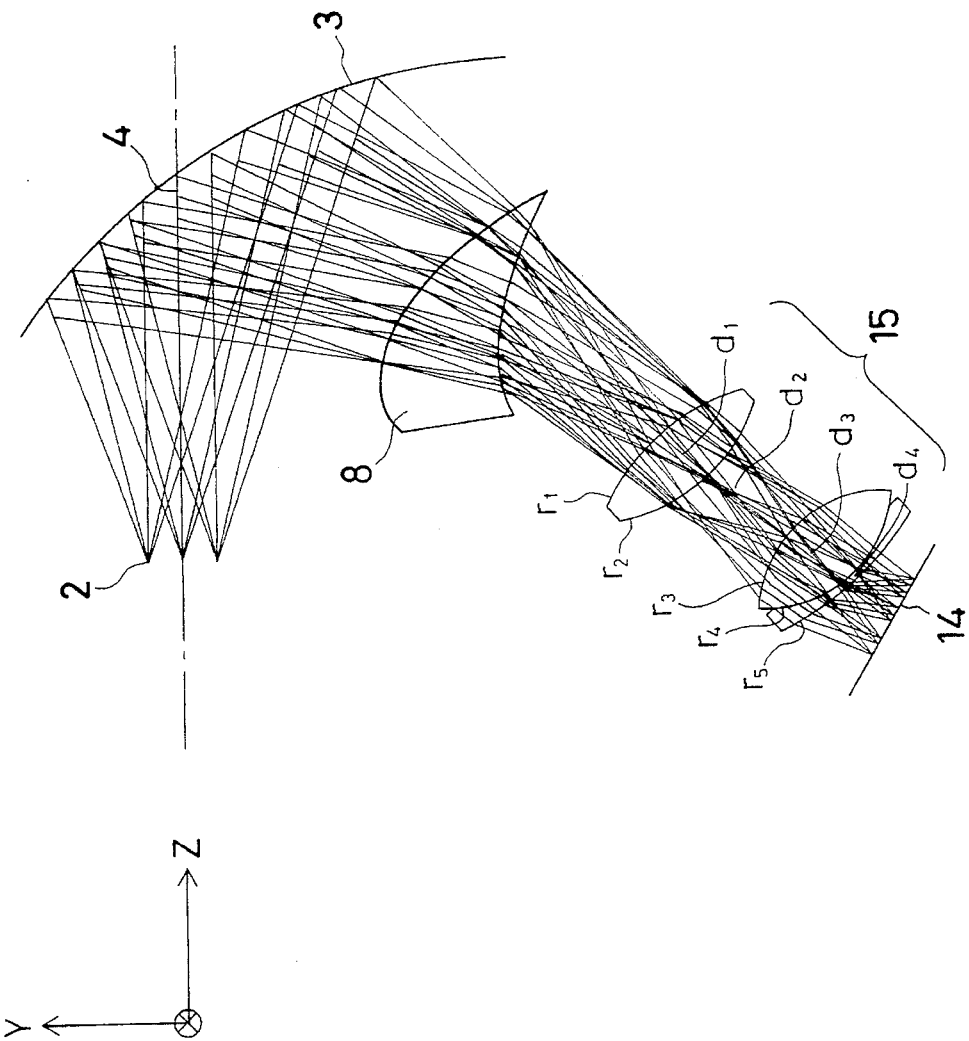
FIG. 12 is a sectional view showing the optical arrangement of Embodiment 8 of the present invention.

Embodiment 8 will be explained below with reference to FIG. 12. The arrangement of this embodiment is approximately the same as in Embodiment 6.

Constituent parameters of the optical system in this embodiment will be shown below. It should be noted that the surface Nos. are shown as ordinal numbers in backward tracing from the position of the exit pupil 2 toward the two-dimensional image display element 14. Embodiment 8 is also the same as Embodiment 6 in the way of defining a coordinate system, the way of giving an eccentricity and/or an inclination angle, and the way of giving a curvature radius, surface separation, refractive index and Abbe's number for each surface. The aspherical configuration is also the same as in Embodiment 6.

| Surface No. | | Curvature radius | Surface separation | | Refractive index (Eccentricity) | Abbe's No. (Inclination angle) |
|---|---|---|---|---|---|---|
| 1 (2) | | ∞(pupil) | 60.446 | | | |
| 2 (3) | $R_y$ | −82.033 | 0 | | Y: −8.037 | 28.437° |
| | $R_x$ | −52.269 | | | | |
| | $K_y$ | −0.930764 | | | | |
| | $K_x$ | −0.656131 | | | | |
| | AR | 0 | | | | |
| | BR | 0 | | | | |
| | AP | 0 | | | | |
| | BP | 0 | | | | |
| 3 (8) | $R_y$ | −11.522 | 0 | | $n = 1.51633$ | $v = 64.1$ |
| | $R_x$ | −27.685 | | | Y: −28.493 | 97.541° |
| | $K_y$ | −0.897431 | | | Z: 24.762 | |
| | $K_x$ | 0.010734 | | | | |
| | AR | 0 | | | | |
| | BR | 0 | | | | |
| | AP | 0 | | | | |
| | BP | 0 | | | | |
| 4 | $R_y$ | −45.865 | 0 | | Y: −48.482 | 70.499° |
| | $R_x$ | −34.708 | | | Z: 42.285 | |
| | $K_y$ | 2.699501 | | | | |
| | $K_x$ | 3.391928 | | | | |
| | AR | 0 | | | | |
| | BR | 0 | | | | |
| | AP | 0 | | | | |
| | BP | 0 | | | | |
| 5 | $(r_1)$ | −23.895 | $(d_1)$ | −9.116 | $n_1 = 1.51633$ | $v_1 = 64.1$ |
| | K | 0 | | | Y: −68.545 | 39.647° |
| | A | $0.335999 \times 10^{-4}$ | | | Z: 17.148 | |

-continued

| Surface No. | | Curvature radius | | Surface separation | Refractive index (Eccentricity) | Abbe's No. (Inclination angle) |
|---|---|---|---|---|---|---|
| | B | $0.104357 \times 10^{-7}$ | | | | |
| 6 | $(r_2)$ | 21.98354 | $(d_2)$ | −12.920 | | |
| | K | 0 | | | | |
| | A | $-0.242064 \times 10^{-4}$ | | | | |
| | B | $0.306259 \times 10^{-7}$ | | | | |
| 7 | $(r_3)$ | −17.155 | $(d_3)$ | −10.789 | $n_2 = 1.60311$ Y: −6.638 | $v_2 = 60.7$ 0.758° |
| 8 | $(r_4)$ | 17.650 | $(d_4)$ | −1 | $n_3 = 1.80518$ | $v_3 = 25.4$ |
| 9 | $(r_5)$ | 40.523 | $(d_5)$ | −7.512 | | |
| 10 (14) | | ∞(image) | | | Y: −0.086 | 18.909° |

$R_{Y1}/R_{Y2} = 0.2512$

In the above-described embodiment, the horizontal angle of view is 50°, while the vertical angle of view is 35°, and the pupil diameter is 10 mm.

In Embodiments 5 to 8, the relay optical system 15 can be disposed on the observer's head (above the observer's eye). Accordingly, the decentered correcting optical system 8 lies above the observer's eyeball. Therefore, the visual display apparatus of the present invention is free from the problem that when the observer views not an aerial image but an outside, real world image, the decentered correcting optical system 8 obstructs a view of the outside world image. If such a problem occurs, the head-mounted visual display apparatus would give the observer uneasiness derived from the narrow field of view when he or she does other work or moves with the apparatus on.

As will be clear from the foregoing description, it is possible according to the present invention to provide a head-mounted visual display apparatus which enables observation of an image which is clear as far as the edges of visual field at a wide angle of view.

It is also possible to provide a head-mounted visual display apparatus which enables the user to observe clearly an aerial image projected in space at a wide angle of view with his/her spectacles on.

What we claim is:

1. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, and a decentered correcting optical system disposed between said relay optical system and said ocular concave reflecting optical system and having a lens surface decentered with respect to an optical axis formed by said relay optical system wherein a surface of said decentered correcting optical system that is the closest to said ocular concave reflecting optical system is convex toward said ocular concave reflecting optical system.

2. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, and a decentered correcting optical system disposed between said relay optical system and said ocular concave reflecting optical system and having one lens which is provided so that a surface thereof which faces said relay optical system and a surface thereof which faces said ocular concave reflecting optical system are both decentered with respect to an optical axis formed by said relay optical system wherein a surface of said decentered correcting optical system that is the closest to said ocular concave reflecting optical system is convex toward said ocular concave reflecting optical system.

3. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, and a decentered correcting optical system disposed between said relay optical system and said ocular concave reflecting optical system and having one lens which is provided so that a surface thereof which faces said relay optical system and a surface thereof which faces said ocular concave reflecting optical system are both decentered with respect to an optical axis formed by said relay optical system, and that an optical axis of said surface on the relay optical system side and an optical axis of said surface on the ocular concave reflecting optical system side intersect each other wherein a surface of said decentered correcting optical system that is the closest to said ocular concave reflecting optical system is convex toward said ocular concave reflecting optical system.

4. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, and a decentered correcting optical system disposed between said relay optical system and said ocular concave reflecting optical system and having a lens which is not rotationally symmetric with respect to an optical axis formed by said relay optical system wherein a surface of said decentered correcting optical system that is the closest to said ocular concave reflecting optical system is convex toward said ocular concave reflecting optical system.

5. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, a decentered correcting optical system disposed between said relay optical system and said ocular concave reflecting optical system and having a lens surface decentered with respect to an optical axis formed by said relay optical system, wherein said decentered correcting optical system includes an anamorphic surface, and wherein said anamorphic surface is formed so that refractive power in a plane containing respective optical axes of said image display device, relay optical system and ocular concave reflecting optical system is larger than refractive power in a plane perpendicular to said plane.

6. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, a decentered correcting optical system disposed between said relay optical system and said ocular concave reflecting optical system and having one lens which is provided so that a surface thereof which faces said relay optical system and a surface thereof which faces said ocular concave reflecting optical system are both decentered with respect to an optical axis formed by said relay optical system, wherein said decentered correcting optical system includes an anamorphic surface, and wherein said anamorphic surface is formed so that refractive power in a plane containing respective optical axes of said image display device, relay optical system and ocular concave reflecting optical system is larger than refractive power in a plane perpendicular to said plane.

7. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, a decentered correcting optical system disposed between said relay optical system and said ocular concave reflecting optical system and having one lens which is provided so that a surface thereof which faces said relay optical system and a surface thereof which faces said ocular concave reflecting optical system are both decentered with respect to an optical axis formed by said relay optical system, and that an optical axis of said surface on the relay optical system side and an optical axis of said surface on the ocular concave reflecting optical system side intersect each other, wherein said decentered correcting optical system includes an anamorphic surface, and wherein said anamorphic surface is formed so that refractive power in a plane containing respective optical axes of said image display device, relay optical system and ocular concave reflecting optical system is larger than refractive power in a plane perpendicular to said plane.

8. A visual display apparatus comprising:

an image display device for forming an image for observation, a relay optical system for relaying a real image from said image display device, an ocular concave reflecting optical system for projecting the real image relayed by said relay optical system as an enlarged image and for reflectively bending rays emitted from said image display device, a decentered correcting optical system disposed between said relay optical system and said ocular concave reflecting optical system and having a lens which is not rotationally symmetric with respect to an optical axis formed by said relay optical system, wherein said decentered correcting optical system includes an anamorphic surface, and wherein said anamorphic surface is formed so that refractive power in a plane containing respective optical axes of said image display device, relay optical system and ocular concave reflecting optical system is larger than refractive power in a plane perpendicular to said plane.

9. A visual display apparatus according to claims 1, 2, 3, 4, 5, 6, 7 or 8, wherein said ocular concave reflecting optical system has a configuration whereby said rays are reflectively bent at at least 60° C.

10. A visual display apparatus according to claim 5, wherein said lens, which has a surface decentered with respect to the optical axis formed by said relay optical system, satisfies the following condition (3):

$$R_{Y1}/R_{Y2} < 0.5 \tag{3}$$

where $R_{Y1}$ is the radius of curvature of the surface of said lens that faces said ocular concave reflecting optical system, and $R_{Y2}$ is the radius of curvature of the surface of said lens that faces said relay optical system.

11. A visual display apparatus according to claims 1, 2, 3, 4, 5, 6, 7, or 8, wherein said decentered correcting optical system is provided one of at and near an image surface relayed by said relay optical system.

12. A visual display apparatus according to claims 1, 2, 3, 4, 5, 6, 7, or 8, wherein said decentered correcting optical system has an aspherical surface.

13. A visual display apparatus according to claims 1, 2, 3, 4, 5, 6, 7, or 8, wherein said relay optical system is decentered with respect to an optical axis of said image display device.

14. A visual display apparatus according to claims 1, 2, 3, 4, 5, 6, 7, or 8, wherein the surface of said decentered correcting optical system that is decentered with respect to the optical axis formed by said relay optical system is also decentered with respect to an optical axis of said image display device.

* * * * *